US009675229B2

United States Patent
Kwak et al.

(10) Patent No.: US 9,675,229 B2
(45) Date of Patent: Jun. 13, 2017

(54) ROBOT CLEANER AND METHOD FOR CONTROLLING THE SAME

(71) Applicant: SAMSUNG ELECTRONICS CO., LTD., Suwon-si, Gyeonggi-do (KR)

(72) Inventors: No San Kwak, Suwon-si (KR); Ji Min Kim, Seoul (KR); Shin Kim, Hwaseong-si (KR); Kyung Shik Roh, Seongnam-si (KR); Jea Yun So, Suwon-si (KR); Suk June Yoon, Seoul (KR); Jong Gap Lee, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/690,807

(22) Filed: Apr. 20, 2015

(65) Prior Publication Data

US 2016/0000290 A1 Jan. 7, 2016

(30) Foreign Application Priority Data

Jul. 2, 2014 (KR) ........................ 10-2014-0082731

(51) Int. Cl.
*G05B 19/04* (2006.01)
*G05B 19/18* (2006.01)
(Continued)

(52) U.S. Cl.
CPC ....... *A47L 11/4061* (2013.01); *A47L 11/4011* (2013.01); *G05D 1/0016* (2013.01);
(Continued)

(58) Field of Classification Search
CPC ............. A47L 11/4061; A47L 11/4011; G05D 1/0011; G05D 1/0088; G05D 1/0214;
(Continued)

(56) References Cited

U.S. PATENT DOCUMENTS

| 4,821,192 A | * | 4/1989 | Taivalkoski | B25J 9/0003 700/258 |
| 7,706,917 B1 | * | 4/2010 | Chiappetta | G05D 1/0225 700/245 |
| 8,515,578 B2 | * | 8/2013 | Chiappetta | G05D 1/0272 180/167 |
| 2002/0027652 A1 | | 3/2002 | Paromtchik et al. | |
| 2005/0027399 A1 | * | 2/2005 | Koh | G05D 1/0221 700/258 |
| 2009/0048727 A1 | * | 2/2009 | Hong | G05D 1/0238 701/26 |

(Continued)

FOREIGN PATENT DOCUMENTS

| KR | 10-2004-0023421 | 3/2004 |
| KR | 10-2008-0010768 | 1/2008 |
| KR | 10-2010-0041380 | 4/2010 |

OTHER PUBLICATIONS

European Search Report issued Dec. 18, 2015 in corresponding European Application No. 15174995.9.

*Primary Examiner* — Nicholas Kiswanto
*Assistant Examiner* — Rachid Bendidi
(74) *Attorney, Agent, or Firm* — Staas & Halsey LLP

(57) ABSTRACT

A robot cleaner includes a traveling unit to move a main body, an obstacle sensing unit to sense an obstacle, a light reception unit to receive modulated light according to a control command of a user, and a controller to control the traveling unit so that the main body traces a light spot formed by the light. If an obstacle is detected, the controller controls the traveling unit such that the main body traces an outline of the obstacle according to the light spot position and the obstacle position.

16 Claims, 55 Drawing Sheets

(51) Int. Cl.
*A47L 11/40* (2006.01)
*G05D 1/00* (2006.01)

(52) U.S. Cl.
CPC ......... *G05D 1/0033* (2013.01); *G05D 1/0088* (2013.01); *A47L 2201/04* (2013.01); *G05D 2201/0215* (2013.01); *Y10S 901/30* (2013.01); *Y10S 901/47* (2013.01)

(58) Field of Classification Search
CPC ........... G05D 2201/0215; G05D 1/027; G05D 1/0221; G05D 1/0225; G05D 1/0234; G05D 1/0242; G05D 1/255; G05D 1/272; G05D 1/0274; G05D 2201/0207; Y10S 901/30; Y10S 901/47
See application file for complete search history.

(56) References Cited

U.S. PATENT DOCUMENTS

| | | | |
|---|---|---|---|
| 2010/0174408 A1* | 7/2010 | Vroomen | G05D 1/0212 700/254 |
| 2012/0022785 A1* | 1/2012 | DiBernardo | G01S 5/163 701/514 |
| 2012/0106829 A1* | 5/2012 | Lee | G05D 1/0274 382/153 |
| 2013/0138246 A1* | 5/2013 | Gutmann | G05D 1/0231 700/253 |
| 2014/0288709 A1* | 9/2014 | Sim | G05D 1/0225 700/259 |

* cited by examiner

FIG. 9
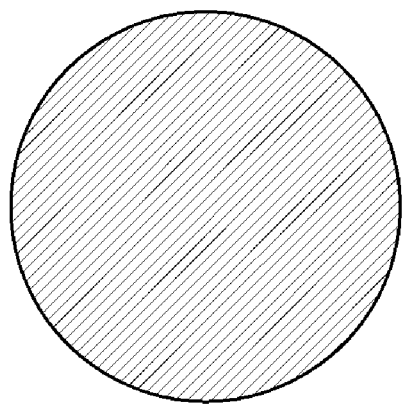
(a)
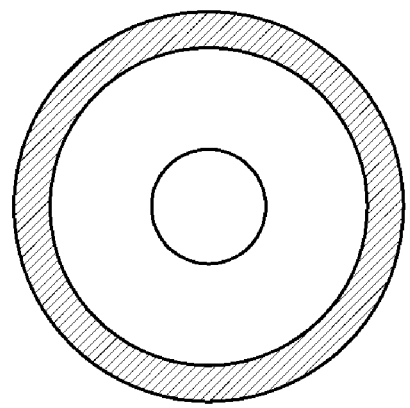
(b)
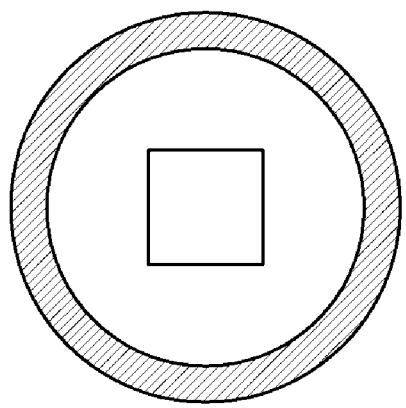
(c)
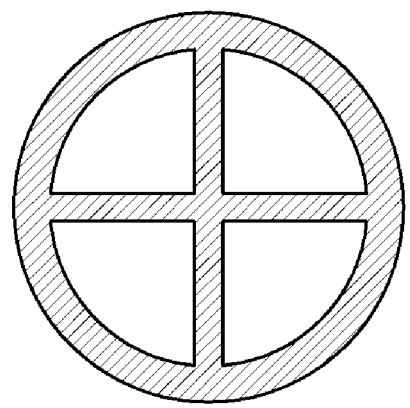
(d)
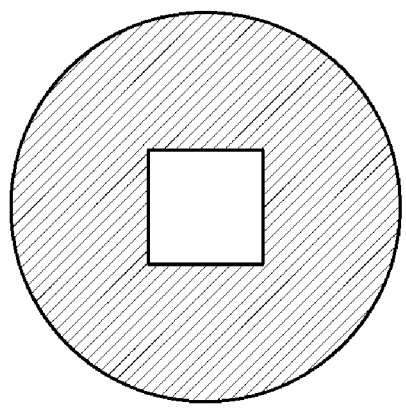
(e)
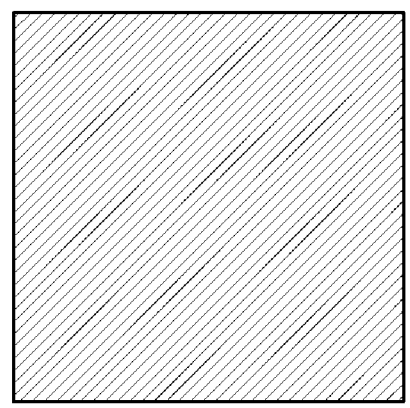
(f)

FIG. 19

ROBOT CLEANER AND METHOD FOR CONTROLLING THE SAME

CROSS-REFERENCE TO RELATED APPLICATIONS

This application claims the benefit of Korean Patent Application No. 10-2014-0082731, filed on Jul. 2, 2014, in the Korean Intellectual Property Office, the disclosure of which is incorporated herein by reference.

BACKGROUND

1. Field

Embodiments of the present disclosure relate to a robot cleaner moving to a position indicated by a remote device, and a method for controlling the same.

2. Description of the Related Art

A robot cleaner (also called a cleaning robot) is an apparatus that automatically cleans a region to be cleaned (hereinafter referred to as a cleaning region) by suctioning impurities, such as dust, etc., from a floor while autonomously traveling about the cleaning region without user intervention.

In accordance with a conventional robot cleaner, if a user desires to first clean a specific position from among the entire cleaning space, the user must directly confirm a current position of the robot cleaner, and then must move the robot cleaner to the specific position using a remote device.

However, assuming that the user does not recognize the current position of the robot cleaner, the user must directly find the robot cleaner. If the robot cleaner is located under furniture such as a sofa or bed, the user may have difficulty in easily finding the robot cleaner.

In order to move the robot cleaner to a specific position, the user must directly manipulate traveling of the robot cleaner using a remote device.

SUMMARY

Therefore, it is an aspect of the present disclosure to provide a robot cleaner configured to prevent collision with an obstacle while tracing a position indicated by a remote device, and a method for controlling the same.

Additional aspects of the disclosure will be set forth in part in the description which follows and, in part, will be apparent from the description, or may be learned by practice of the disclosure.

In accordance with one aspect of the present disclosure, a robot cleaner includes: a traveling unit to move a main body; an obstacle sensing unit to sense an obstacle; a light reception unit to receive modulated light according to a control command of a user; and a controller to control the traveling unit in such a manner that the main body traces a light spot formed by the light. If the obstacle is detected, the controller controls the traveling unit such that the main body traces an outline of the obstacle according to the light spot position and the obstacle position.

The controller may perform any one of a right tracing traveling in which a right side of the main body travels toward the obstacle and a left tracing traveling in which a left side of the main body travels toward the obstacle.

If the obstacle is located on a traveling direction of the main body, the controller may control the traveling unit in such a manner that the main body rotates toward the light spot and traces the obstacle outline.

If the obstacle is located on the traveling direction of the main body and the light spot is located at a right side of the obstacle, the controller may control the traveling unit in such a manner that the main body performs the left tracing traveling.

If the obstacle is located on the traveling direction of the main body and the light spot is located at a left side of the obstacle, the controller may control the traveling unit in such a manner that the main body performs the right tracing traveling.

If the obstacle is located at a side of the main body, the controller may control the traveling unit in such a manner that the main body traces the obstacle outline according to the obstacle position.

If the obstacle is located at a right side of the main body, the controller may control the traveling unit in such a manner that the main body traces the right tracing traveling.

If the obstacle is located at a left side of the main body, the controller may control the traveling unit in such a manner that the main body traces the left tracing traveling.

If the obstacle is located not only at the traveling direction of the main body but also at a side of the main body, the controller may control the traveling unit in such a manner that the main body performs the obstacle outline according to the light spot position and the obstacle position.

If the obstacle is located not only at the traveling direction of the main body but also at a right side of the main body, the controller may control the traveling unit in such a manner that the main body performs the right tracing traveling.

If the obstacle is located not only at the traveling direction of the main body but also at a left side of the main body, the controller may control the traveling unit in such a manner that the main body performs the left tracing traveling.

If the obstacle is located not only at the traveling direction of the main body but also at both sides of the main body, the controller may control the traveling unit in such a manner that the main body performs any one of the right tracing traveling and the left tracing traveling in response to the light spot position.

If the light spot is located opposite to the obstacle during the outline tracing traveling, the controller may trace the light spot.

The controller may divide a light reception region for light-spot detection into a plurality of reception regions according to respective directions, and determine a reception region in which the light spot is located from among the plurality of reception regions.

The controller may divide an obstacle detection region for obstacle detection into a plurality of detection regions according to respective directions, and determine a detection region in which the obstacle is located from among the plurality of detection regions.

In accordance with another aspect of the present disclosure, a method for controlling a robot cleaner includes: receiving modulated light including a control command of a user; tracing a light spot formed by the light; and if the obstacle is detected, performing any one of right tracing traveling and left tracing traveling according to the light spot position and the obstacle position.

The performing of any one of the right tracing traveling and the left tracing traveling may include: if the obstacle is located on a traveling direction of the main body and the light spot is located at a right side of the obstacle, performing the left tracing traveling.

The performing of any one of the right tracing traveling and the left tracing traveling may include: if the obstacle is located at a traveling direction of the main body and the light spot is located at a left side of the obstacle, performing the right tracing traveling.

The performing of any one of the right tracing traveling and the left tracing traveling may include: if the obstacle is located at a right side of the robot cleaner, performing the right tracing traveling.

The performing of any one of the right tracing traveling and the left tracing traveling may include: if the obstacle is located at a left side of the robot cleaner, performing the left tracing traveling.

In accordance with one aspect of the present disclosure, the robot cleaner and the method for controlling the same according to the present disclosure can trace the obstacle outline according to not only the position of a light spot (LS) formed at a specific position indicated by a remote device, but also the obstacle (O) position, so that they avoid collision with the obstacle while tracing the position indicated by the remote device.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 exemplarily illustrates light spots formed by the remote device according to an embodiment of the present disclosure.

FIG. 19 exemplarily illustrates a method for allowing the robot cleaner to detect the position of a light spot according to types of an infrared receiver receiving infrared light.

DETAILED DESCRIPTION

Figure 1:
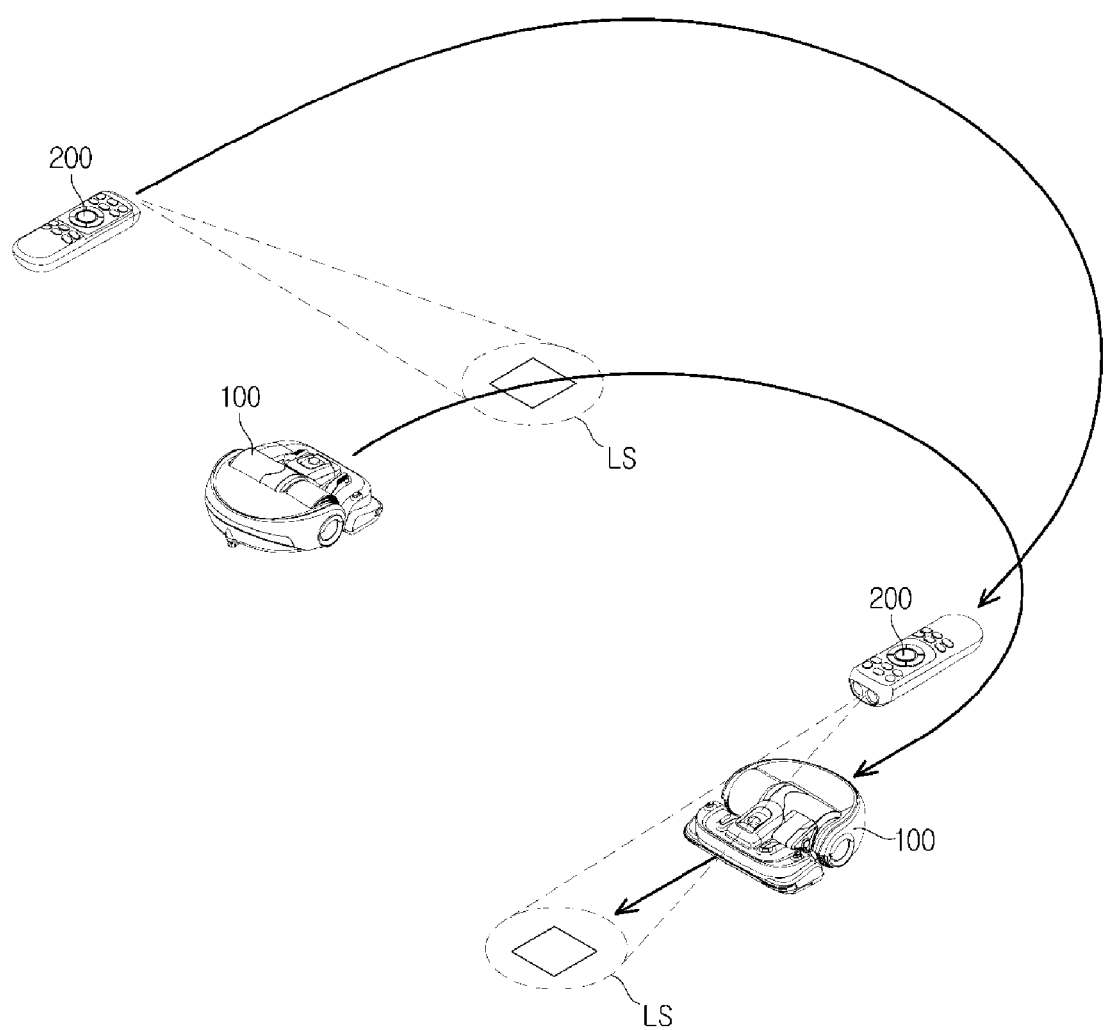
FIG. 1 is a conceptual diagram illustrating operations of a robot cleaner and a remote device according to an embodiment of the present disclosure.

Reference will now be made in detail to the embodiments of the present disclosure, examples of which are illustrated in the accompanying drawings, wherein like reference numerals refer to like elements throughout.

Figure 2:
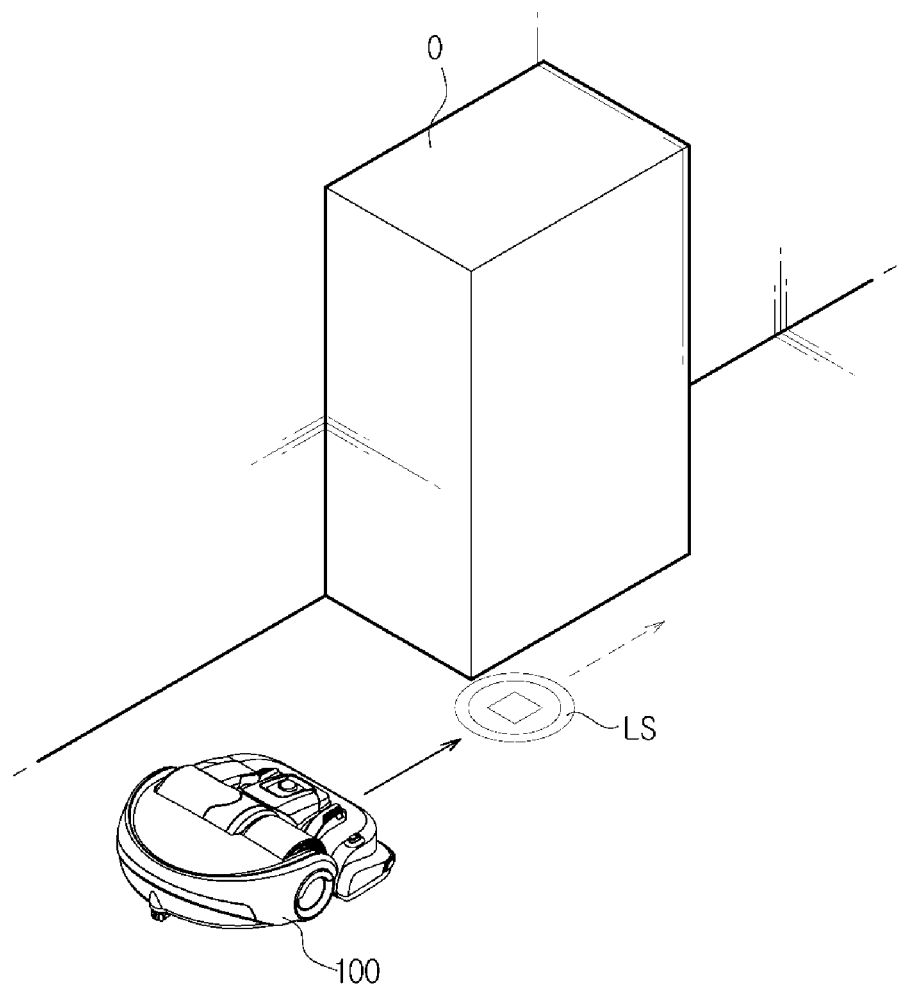
FIGS. 2 to 4 exemplarily illustrate that a robot cleaner travels in a cleaning space.
Figure 3:
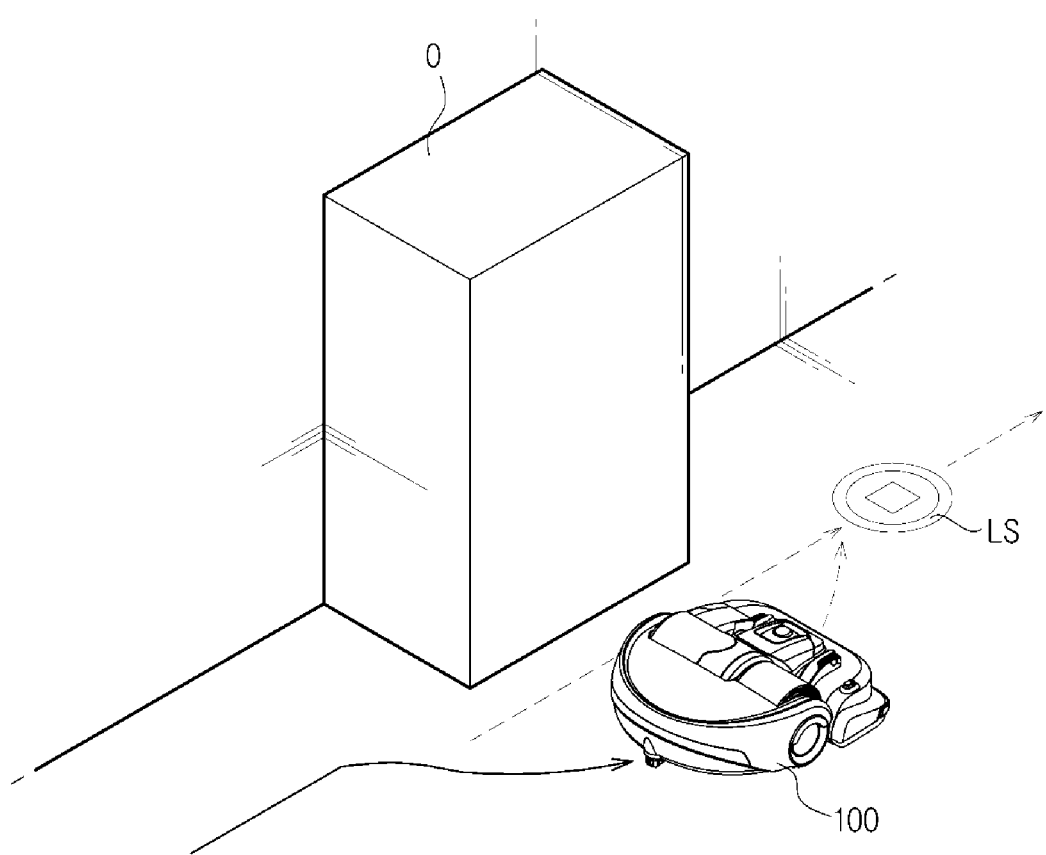
Figure 4:
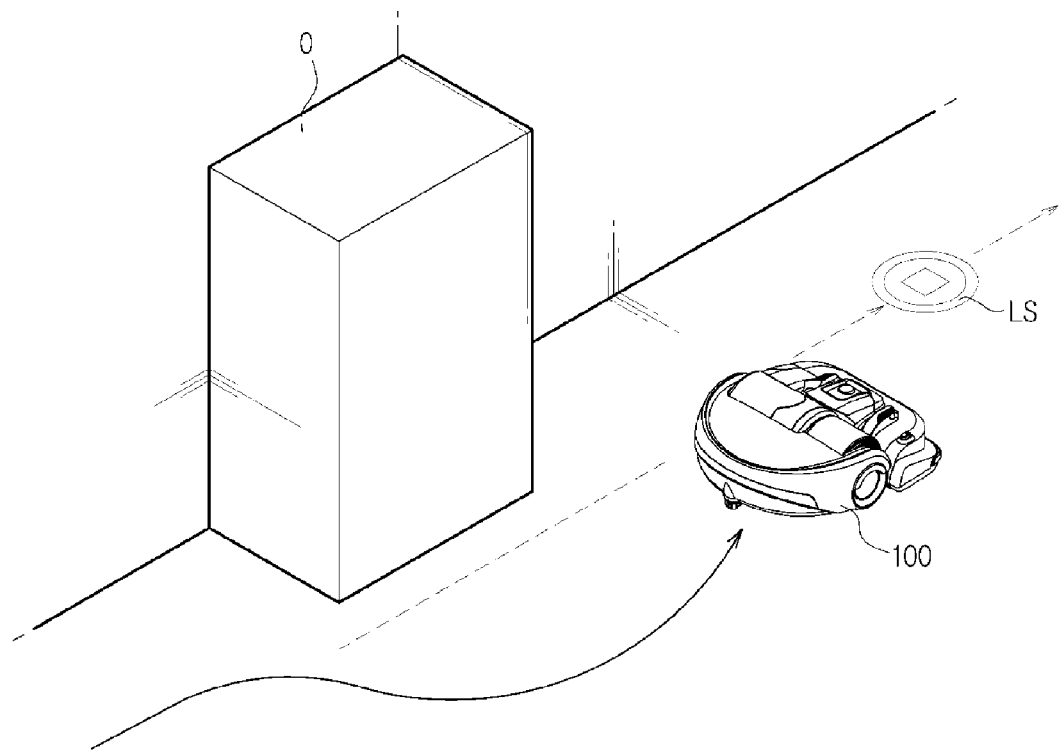

FIG. 1 is a conceptual diagram illustrating operations of a robot cleaner and a remote device according to an embodiment of the present disclosure. FIGS. 2 to 4 exemplarily illustrate that the robot cleaner travels in a cleaning space.

The operations of a robot cleaner 100 and a remote device 200 according to the embodiments of the present disclosure will hereinafter be described with reference to FIGS. 1 to 4.

The robot cleaner 100 travels about a cleaning region so as to clean the cleaning region. The remote device 200 may receive a control command from a user, and may transfer the control command to the robot cleaner 100. In more detail, the remote device 200 may modulate infrared light in response to the user-input control command, and may emit the modulated infrared light.

The user who uses the remote device 200 can input the control command to the robot cleaner 100, and can also indicate a specific position to which the robot cleaner 100 will move.

For example, if the user inputs a drag command, the remote device 200 modulates infrared light in response to the drag command and emits the modulated infrared light. The robot cleaner 100 receives the modulated infrared light and demodulates the received infrared light, so that it can receive the drag command from the user. If the drag command is input to the robot cleaner 100, the robot cleaner 100 may move in the reception direction of the modulated infrared light.

In other words, the robot cleaner 100 may trace the position indicated by the user who uses the remote device 200.

As described above, the infrared light emitted from the remote device 200 may transmit a control command to the robot cleaner 100, and may inform the robot cleaner 100 of the position indicated by the user.

In addition, the remote device 200 may emit visible light such that the position indicated by the remote device 200 can be displayed for user recognition. The user who uses the remote device 200 may indicate a position to which the robot cleaner 100 will move, and the remote device 200 may emit visible light toward the user-indicated position.

The visible light and the infrared light emitted from the remote device 200 may be projected onto the floor to be cleaned as shown in FIG. 1, resulting in formation of a light spot (LS). The user and the robot cleaner 100 may recognize the position indicated by the remote device 200 through the light spot (LS).

If the user changes the indication position to another position using the remote device 200, the robot cleaner 100 may redetect the position indicated by the remote device 200, and then move toward the redetected position.

In other words, the robot cleaner 100 may perform drag traveling so as to trace the position (i.e., LS) indicated by the remote device 200.

In addition, if the robot cleaner 100 detects an obstacle (O) on the traveling path during LS (Light Spot) tracing, the robot cleaner 100 may perform the outline tracing travel to prevent collision with the obstacle (O).

For example, the robot cleaner 100 may perform drag traveling to trace the light spot (LS) as shown in FIG. 2. In more detail, the robot cleaner 100 may detect the LS position, and may move in a manner that the LS is located in front of the robot cleaner 100.

The robot cleaner 100 may search for the obstacle (O) on the travel path during drag traveling.

If the obstacle (O) on the traveling path is detected, the robot cleaner 100 may move along the outline of the obstacle (O) so as to prevent collision with the obstacle (O) as shown in FIG. 3.

The robot cleaner 100 may determine whether the LS position moves away from the obstacle (O) during the outline tracing of the obstacle (O).

If the LS position moves away from the obstacle (O), the robot cleaner 100 may stop the outline tracing of the obstacle (O) as shown in FIG. 4, and may re-perform the drag operation for LS tracing.

The above-mentioned embodiment has exemplarily disclosed the operations of the robot cleaner 100 and the remote device 200.

Detailed structures and operations of the robot cleaner 100 and the remote device 200 will hereinafter be described with reference to the attached drawings.

Figure 5:
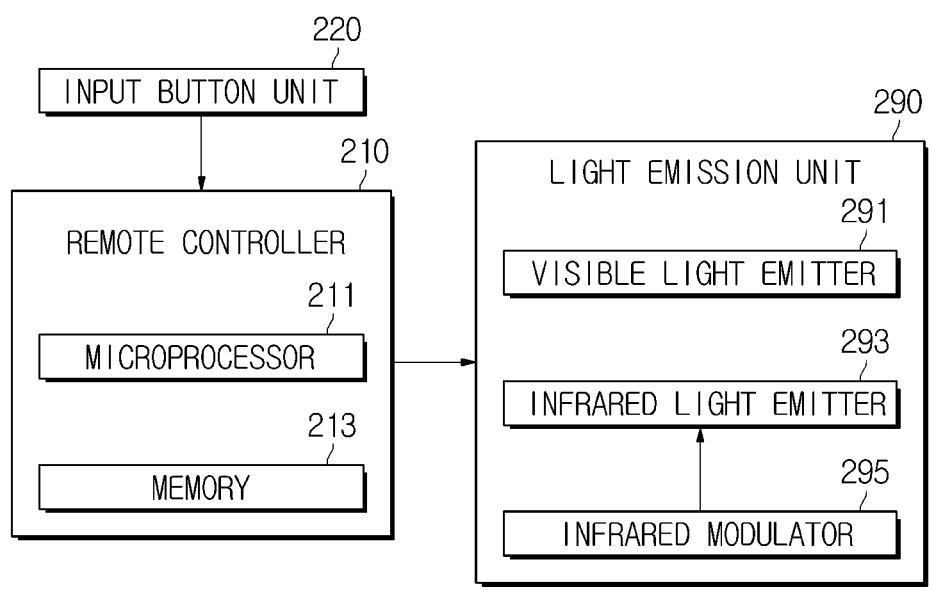
FIG. 5 is a block diagram illustrating a remote device according to an embodiment of the present disclosure.
Figure 6:
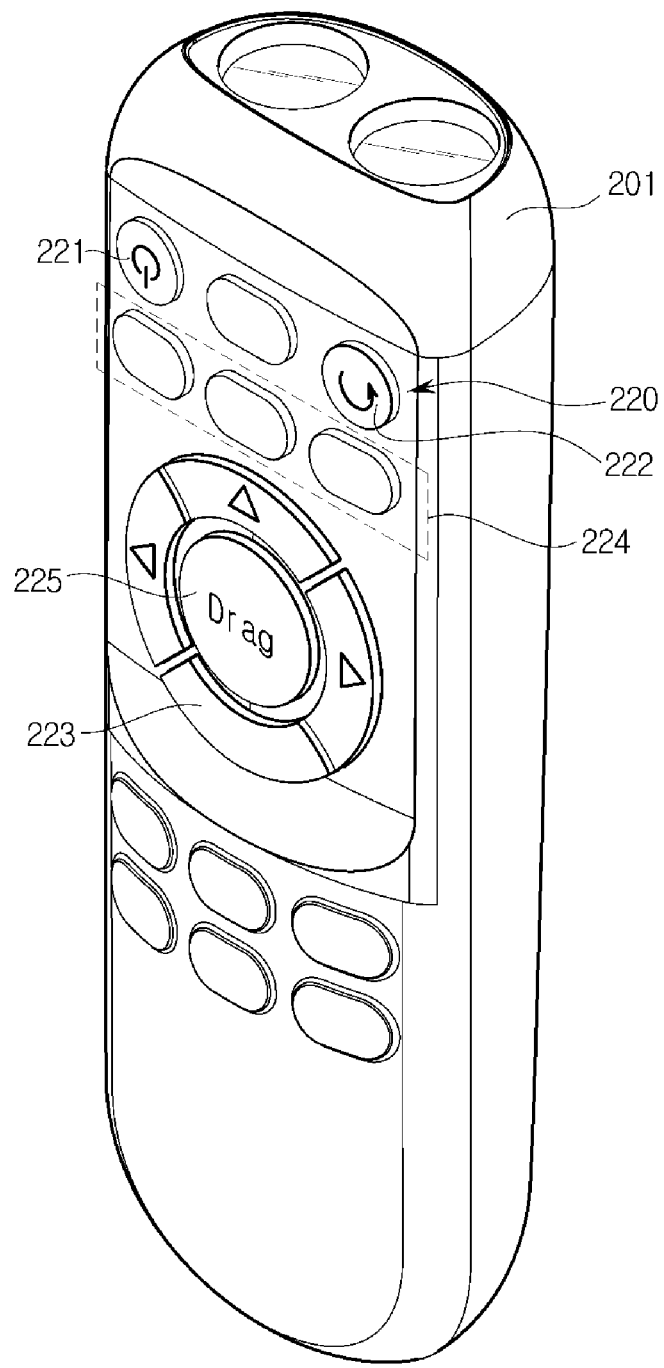
FIG. 6 is a perspective view illustrating the appearance of the remote device according to an embodiment of the present disclosure.

FIG. 5 is a block diagram illustrating a remote device according to an embodiment of the present disclosure. FIG. 6 is a perspective view illustrating the appearance of the remote device according to an embodiment of the present disclosure.

Referring to FIGS. 5 and 6, the remote device 200 includes an input button unit 220 to receive a control command from a user; a light emission unit 290 to emit visible light and infrared light; and a remote controller 210 controlling the light emission unit 290 to emit visible light and infrared light in response to a control command of the user.

The input button unit 220 may receive a control command from the user, and may be provided on the top surface of the main body 201 forming the external appearance of the remote device 200.

The input button unit 220 may include a power button 221 for turning the robot cleaner 100 on or off; a return button 222 for returning the robot cleaner 100 to a charging station (not shown) for power charging; an operation/stop button 223 for operating or stopping the robot cleaner 100; and a plurality of cleaning mode buttons 224 for selecting any one of cleaning modes of the robot cleaner 100. Specifically, the input button unit 220 may include a drag button 225 for inputting a drag command to allow the robot cleaner 100 to move along a movement path indicated by the user.

Individual buttons contained in the input button unit 220 may include a push switch for sensing user's pressure, a membrane switch, or a touch switch for sensing contact of some parts of a user's body.

Although not shown in FIG. 6, the remote device 200 may further include a display for displaying operation information of the robot cleaner 100 in response to a user-input control command, or a touchscreen for receiving a control command from the user and displaying operation information of the robot cleaner 100 in response to the received control command.

The light emission unit 290 may modulate infrared light in response to the user-input control command, and may emit the modulated infrared light. For example, the light emission unit 290 may emit a first infrared pulse and a second infrared pulse in response to the control command.

The light emission unit 290 may emit the visible light to display a specific position indicated by the remote device 200. The user who uses the remote device 200 may indicate a desired position at which the robot cleaner 100 will arrive, and the remote device 200. The remote device 200 may emit the visible light to the user-indicated position.

The light emission unit 290 may include a visible light emitter 291 for emitting visible light capable of being recognized by the user, an infrared light emitter 293 for emitting infrared light capable of being recognized by the robot cleaner 200, and an infrared modulator 295 for modulating infrared light to be emitted from the infrared light emitter 293.

Specifically, infrared light emitted from the light emission unit 290 may be modulated by the user-input control command. For example, the light emission unit 290 may emit pulse-shaped infrared light that is PWM-processed in response to the user-input control command.

The configuration and operations of the light emission unit 290 will hereinafter be described in detail.

The remote controller 210 may provide overall control to the remote device 200.

In more detail, the remote controller 210 may control the light emission unit 290 to emit the modulated infrared light according to the user-input control command.

For example, if the user inputs a drag command, the remote controller 210 may control the light emission unit 290 to emit not only the visible light but also the infrared light modulated by the drag command. If the user inputs the operation/stop command, the remote controller 210 may control the light emission unit 290 to emit the modulated infrared light according to the operation/stop command.

The remote controller 210 may include a memory 213 for storing a control program and control data to control the remote device 200; and a microprocessor 211 for performing associations in response to the control program and control data stored in the memory 213.

The memory 213 may include a non-volatile memory to semi-permanently store control programs and control data and a volatile memory to temporarily store control programs and control data. For example, the non-volatile memory may include a flash memory, an Erasable Programmable Read Only Memory (EPROM), Electrically Erasable Programmable Read Only Memory (EEPROM), etc.

The microprocessor 211 may perform operation in response to the control program and control data stored in the memory 213.

For example, the microprocessor 211 may process electric signals received from the input button unit 220, and may output control signals to the light emission unit 290 according to the processed result.

The following detailed operations of the remote device 200 may be carried out by the control operation of the remote controller 210.

The detailed configuration of the light emission unit 290 will hereinafter be described with reference to the attached drawings.

Figure 7A:
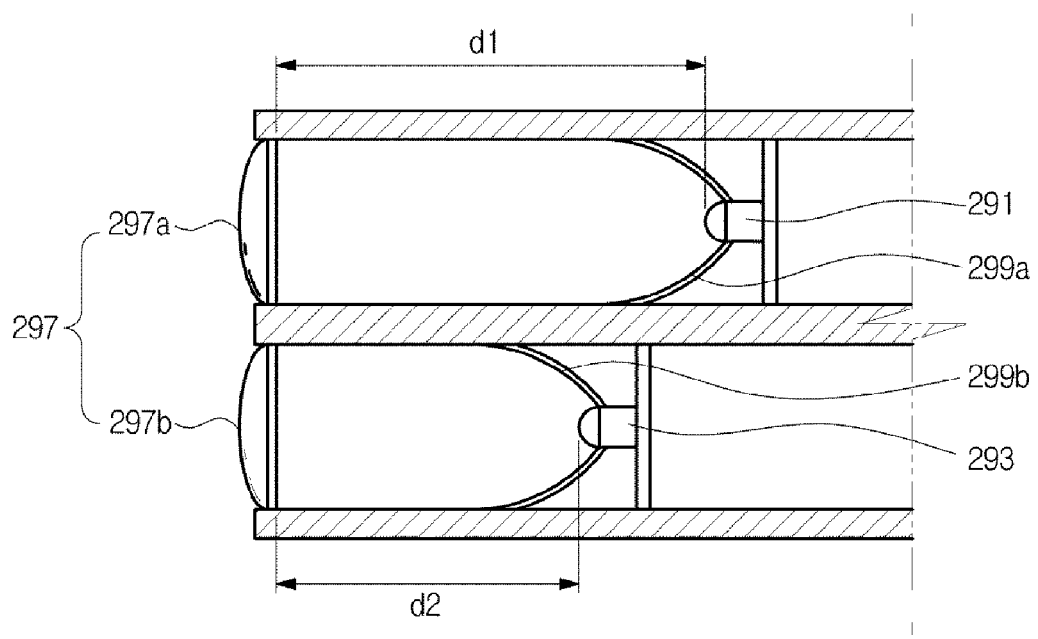
FIGS. 7A and 7B are structural views illustrating a light emission unit contained in the remote device according to an embodiment of the present disclosure.
Figure 7B:
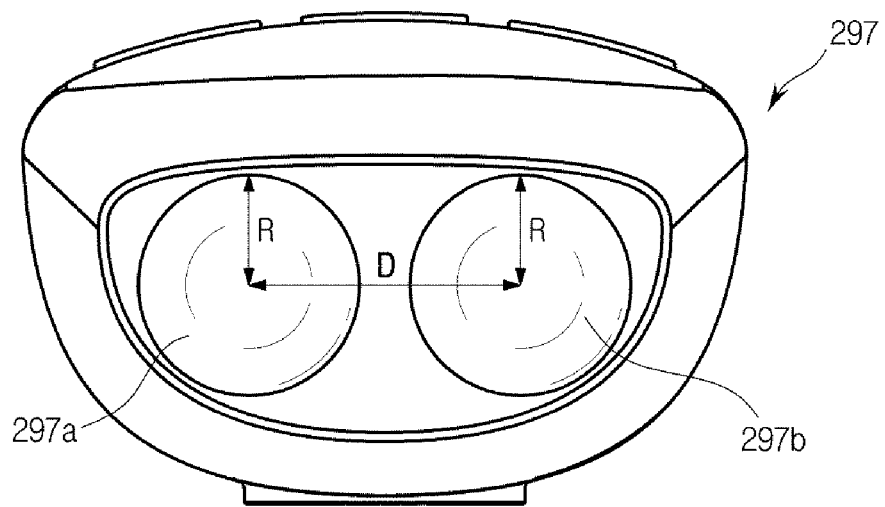
Figure 8:
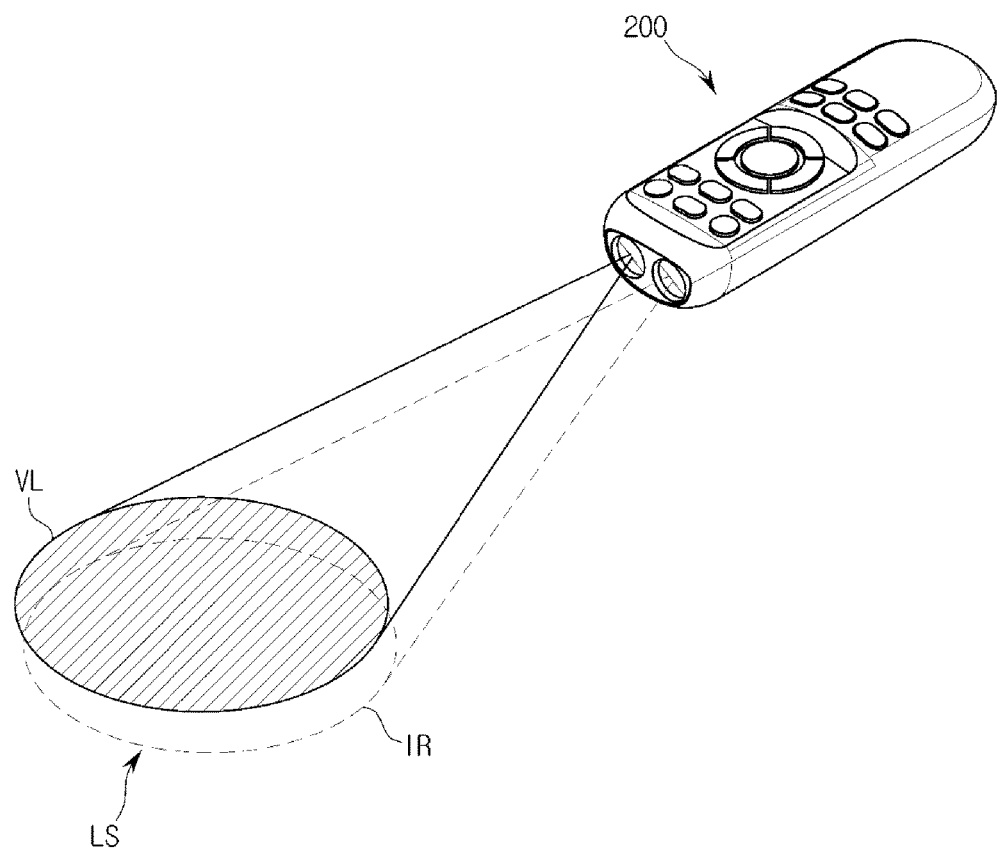
FIG. 8 is a view illustrating a light spot formed when the remote device emits a light to a cleaning region to be cleaned according to an embodiment of the present disclosure.

FIGS. 7A and 7B are structural views illustrating a light emission unit contained in the remote device according to an embodiment of the present disclosure. FIG. 8 is a view illustrating a light spot formed when the remote device emits a light to a cleaning region to be cleaned according to an embodiment of the present disclosure. FIG. 9 exemplarily illustrates light spots formed by the remote device according to an embodiment of the present disclosure.

Referring to FIGS. 7A to 9, the light emission unit 290 may further include condensing plates (299a, 299b) and a lens module 297 in addition to the visible light emitter 291, the infrared light emitter 293, and the infrared modulator 295.

The visible light emitter 291 may emit visible light in response to a control signal from the remote controller 210. The visible light emitter 291 may include a visible light LED or visible light laser diode configured to emit visible light.

The infrared light emitter 293 may emit the infrared light modulated by the modulation signal generated from the infrared modulator 295.

The infrared light emitter 293 may include an infrared light LED or infrared light laser diode configured to emit the infrared light.

The infrared modulator 295 may output a modulation signal for modulating the infrared light in response to the user-input control command.

In more detail, the infrared modulator 295 may generate a pulse width modulation (PWM) signal to modulate an infrared pulse width in response to the user-input control command.

The infrared light emitter 293 may output a first infrared pulse having a first pulse width so as to transmit data "1". In this case, the infrared modulator 295 may transmit a first modulation signal to the infrared light emitter 293 so as to output a first infrared pulse.

The infrared light emitter 293 may output a second infrared pulse having a second pulse width so as to transmit data "0". In this case, the infrared light modulator 295 may transmit a second modulation signal to the infrared light emitter 293 so as to output a second infrared pulse.

For example, if a signal corresponding to a control command is "0100", the infrared modulator 295 may sequentially output the modulation signals in the order of second modulation signal→first modulation signal→second modulation signal→second modulation signal.

The infrared light modulation is not limited to pulse width modulation (PWM), and the robot cleaner 100 may modulate the intensity or frequency of infrared light.

Reflective plates (299a, 299b) may include a first reflective plate 299a for reflecting visible light in a manner that the visible light emitted from the visible light emitter 291 is condensed; and a second reflective plate 299b for reflecting infrared light in a manner that the infrared light emitted from the infrared light emitter 293 is condensed.

An inclined place of each reflective plate (299a or 299b) may be formed in a convex cone shape in such a manner that a cross section of each reflective plate is formed in a parabolic shape. Each of the reflective plates (299a, 299b) may be formed of a metal material having superior reflectivity of the visible light and the infrared light.

The lens module 297 may include a first lens 297a for refracting the visible light so as to condense the visible light emitted from the visible light emitter 291; and a second lens 297b for refracting the infrared light so as to condense the infrared light emitted from the infrared light emitter 293.

Individual lens modules 297 may include a convex lens for condensing incident light and outputting the condensed light.

The visible light emitted from the visible light emitter 291 through the reflective plates (299a, 299b) and the lens module 297 may be a beam-shaped visible light, and the infrared light emitted from the infrared light emitter 293 may be beam-shaped infrared light.

If the light emission unit 290 emits the visible light and the infrared light to the floor to be cleaned, the visible light and the infrared light are projected onto the floor to be cleaned, so that a visible light spot (VL) and an infrared light spot (IR) are formed as shown in FIG. 8.

The user may recognize the position indicated by the remote device 200 through the VL spot, and the robot cleaner 100 may recognize the position indicated by the remote device 200 through the IR spot (IR).

In addition, the infrared light emitted from the light emission unit 290 of the remote device 200 is modulated by a control command of the user, and the robot cleaner 100 may recognize the user control command by demodulating the modulated infrared light.

As described above, the infrared light emitted from the remote device 200 may include information regarding the user control command and information regarding a user-indicated position, so that the remote device 200 may simultaneously transmit two kinds of information to the robot cleaner 100 using the infrared light. As a result, the infrared light emitter for transmitting the user control command and the other infrared light emitter for indicating the user-indicated position may be separately provided as necessary.

In addition, the VL spot and the IR spot may overlap with each other in such a manner that the position recognized by the user is identical to the position recognized by the robot cleaner 100. By the above-mentioned light spot (LS), the user and the robot cleaner 100 may recognize the position indicated by the remote device 200.

In addition, the size (R) of each of the first lens 297a and the second lens 297b, the distance (d1) between the first lens 297a and the visible light emitter 291, and the distance (d2) between the second lens 297b and the infrared light emitter 293 can be adjusted in such a manner that the VL spot and the IR spot are readily identified by the user and the robot cleaner 100, and the VL spot and the IR spot maximally overlap with each other.

For example, as the size (R) of each of the first lens 297a and the second lens 297b increases, the light is much more concentrated so that the VL spot and the IR spot are gradually reduced in size whereas the VL spot and the IR spot become brighter.

In addition, as the distance (d1) between the first lens 297a and the visible light emitter 291 and the distance (d2) between the second lens 297b and the infrared light emitter 293 become longer, the VL spot and the IR spot are gradually reduced in size whereas the VL spot and the IR spot become brighter.

A diameter of each of the first lens 297a and the second lens 297b may be set to 15 mm or less in such a manner that each of the VL spot and the IR spot can be formed with proper brightness and proper size. In addition, the distance (d1) between the first lens 297a and the visible light emitter 291 may be set to 30 mm or less, and the distance (d2) between the second lens 297b and the infrared light emitter 293 may be set to 40 mm or less.

In addition, the visible light and the infrared light have different wavelengths, and the distance (d1) between the first lens 297a and the visible light emitter 291 may be different from the distance (d2) between the second lens 297b and the infrared light emitter 293.

In order to increase the overlap ratio between the VL spot and the IR spot, the distance (D) between the center point of the first lens 297a and the center point of the second lens 297b may be adjusted.

Assuming that the size (R) of each of the first lens 297a and the second lens 297b, the distance (d1) between the first lens 297a and the visible light emitter 291, and the distance (d2) between the second lens 297b and the infrared light emitter 293 are established as described above, the distance (D) between the center point of the first lens 297a and the second lens 297b may be set to 20 mm or less.

If the distance (D) between the center point of the first lens 297a and the center point of the second lens 297b is set to 20 mm or less, the overlap ratio between the VL spot and the IR spot is set to 90% or higher.

In addition, the light spot (LS) may have various formats as shown in FIG. 9 in such a manner that the position indicated by the remote device 200 can be readily recognized by the user.

The user recognizes the position indicated by the remote device 200 through the VL spot, such that the VL spot may have various formats as shown in FIG. 9.

In order to allow the VL spot to have various shapes, a pattern corresponding to the LS shown in FIG. 9 may be formed at the first lens 297a. Alternatively, an optical member (not shown) in which an opaque pattern corresponding to the LS shape shown in FIG. 9 is formed may be disposed between the first lens 297a and the visible light emitter 291.

The configuration and operation of the remote device 200 will hereinafter be described in detail.

The configuration and operation of the robot cleaner 100 will hereinafter be described in detail.

Figure 10:
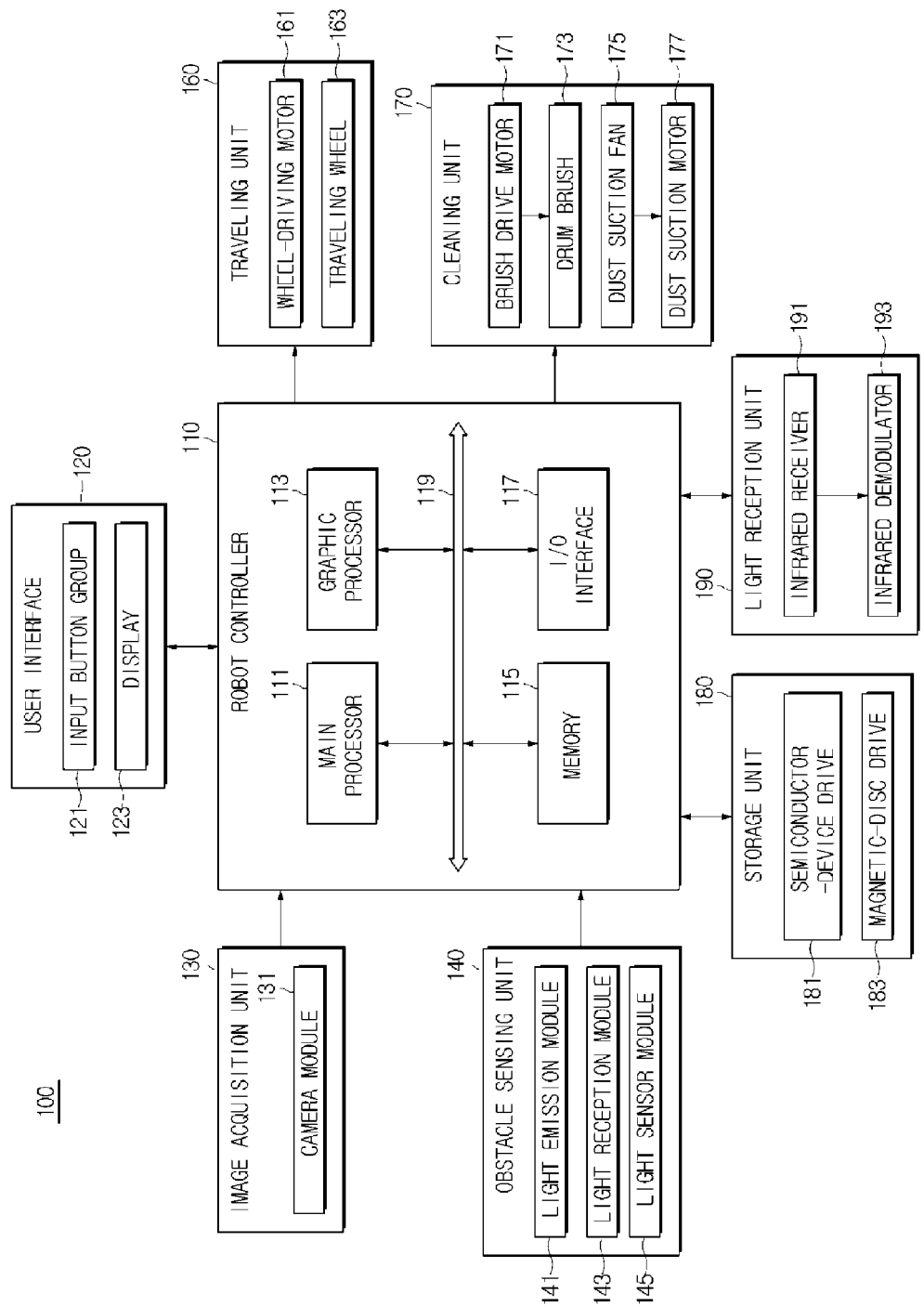
FIG. 10 is a block diagram illustrating a robot cleaner according to an embodiment of the present disclosure.
Figure 11:
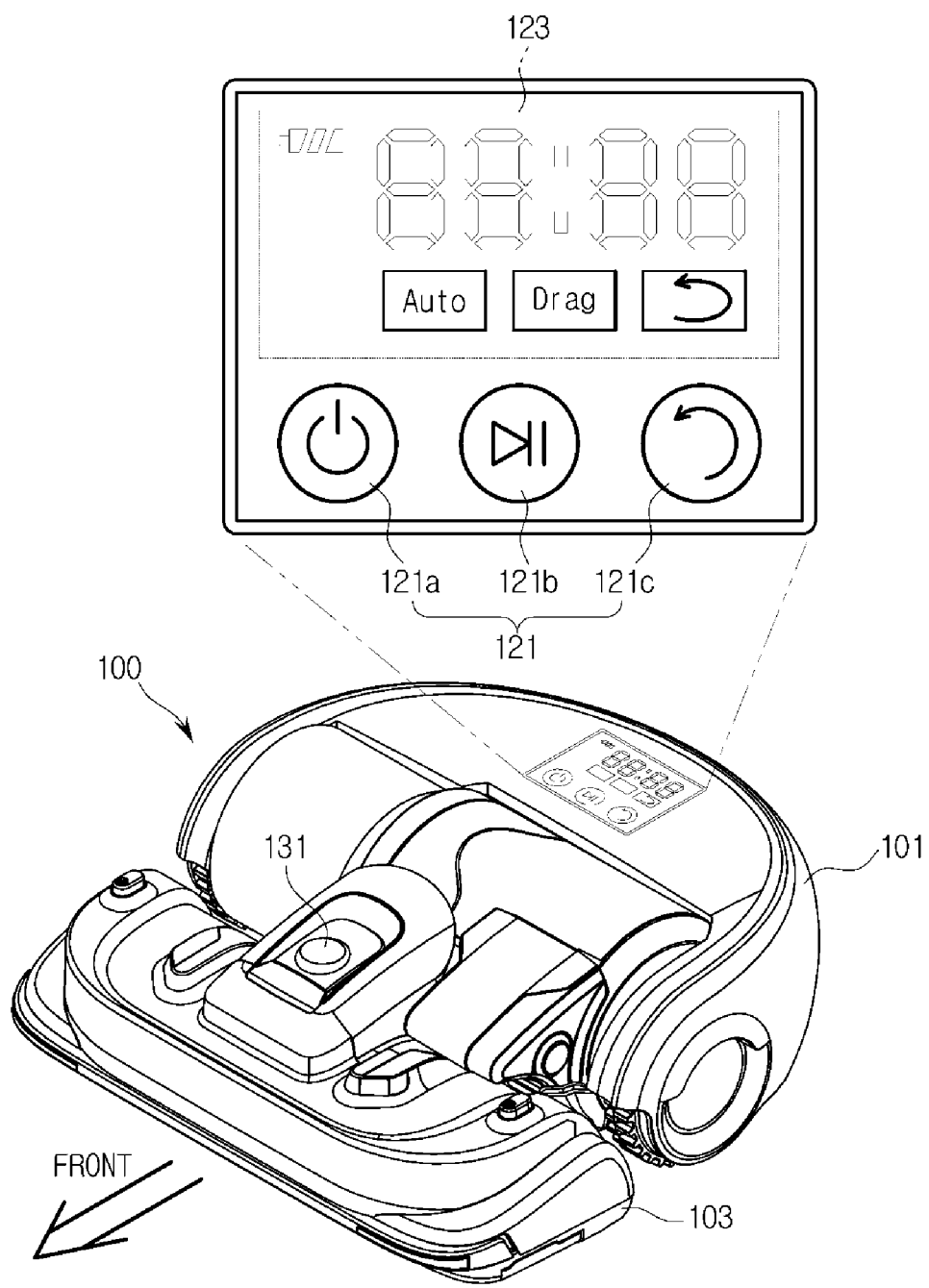
FIG. 11 illustrates the appearance of the robot cleaner according to an embodiment of the present disclosure.
Figure 12:
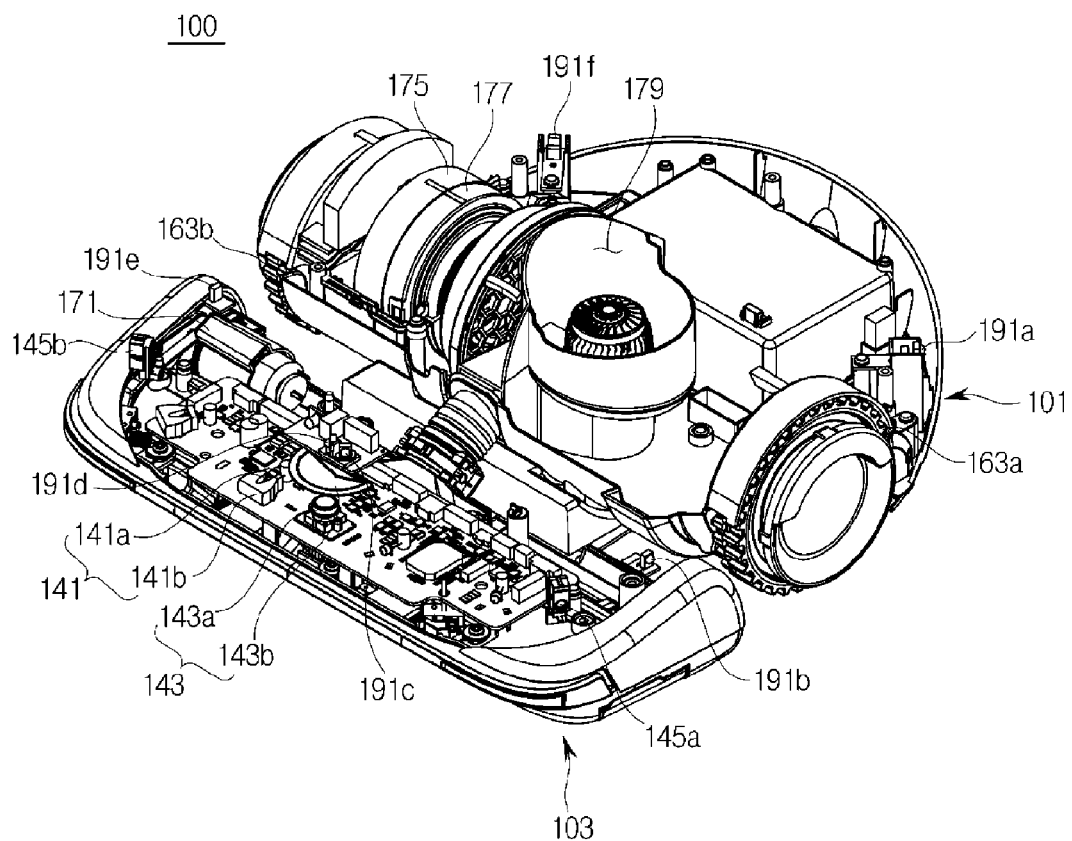
FIGS. 12 and 13 illustrate the internal structure of the robot cleaner according to an embodiment of the present disclosure.
Figure 13:
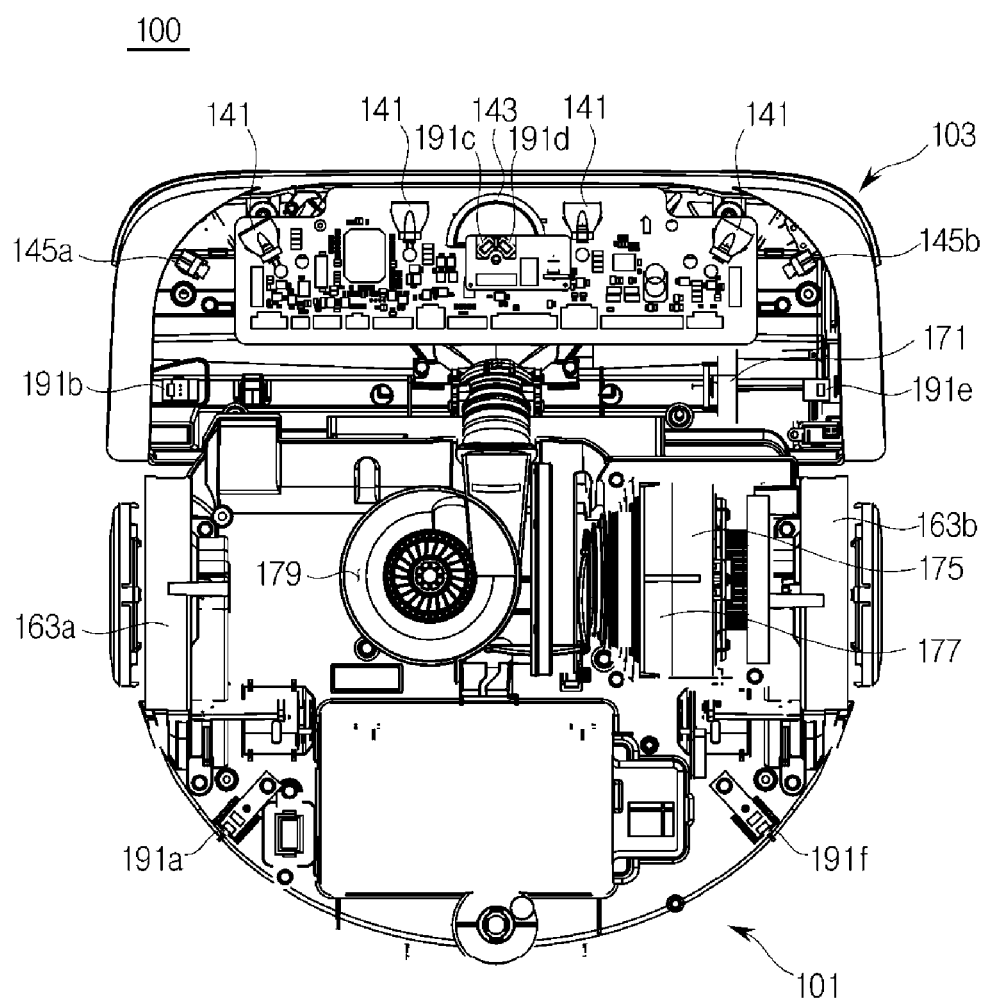
Figure 14:
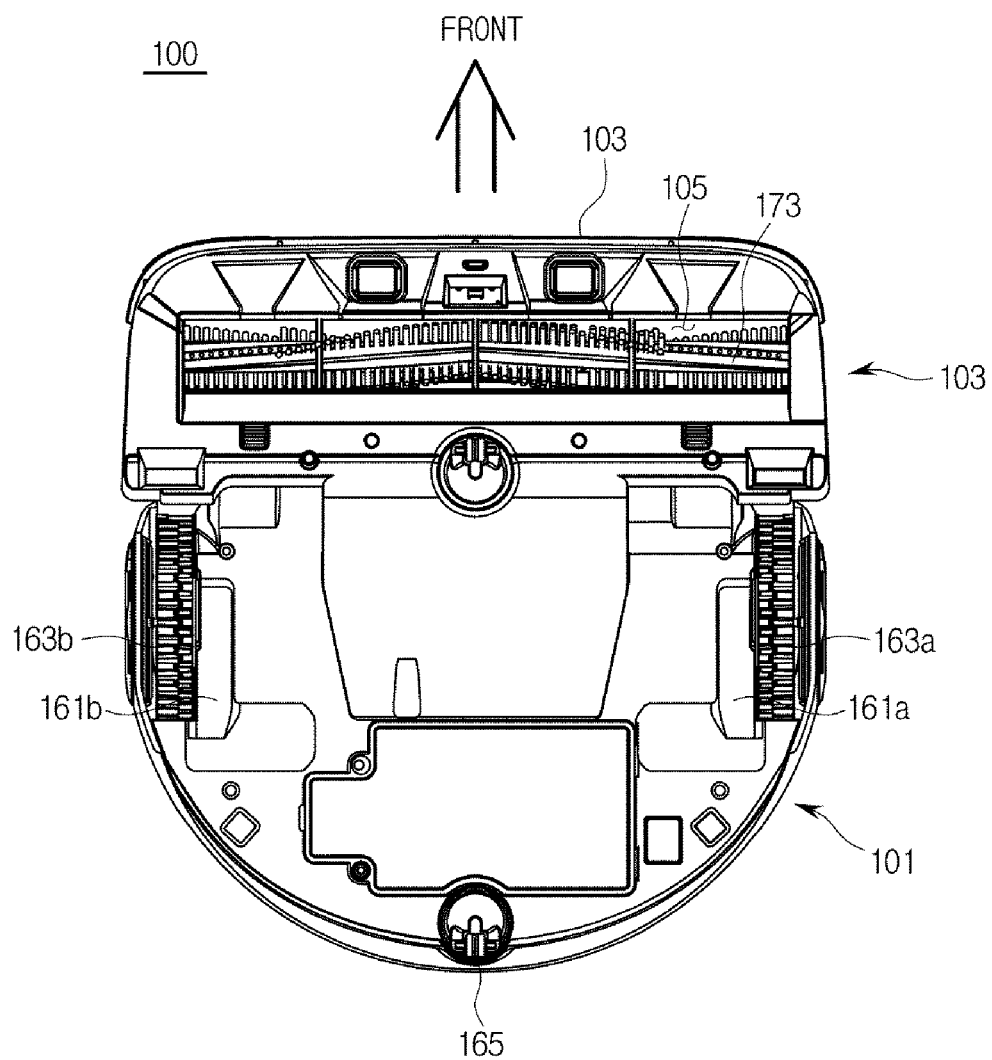
FIG. 14 illustrates the bottom surface of the robot cleaner according to an embodiment of the present disclosure.

FIG. 10 is a block diagram illustrating a robot cleaner according to an embodiment of the present disclosure. FIG. 11 illustrates the appearance of the robot cleaner according to an embodiment of the present disclosure. FIGS. 12 and 13 illustrate the internal structure of the robot cleaner according to an embodiment of the present disclosure. FIG. 14 illustrates the bottom surface of the robot cleaner according to an embodiment of the present disclosure.

Referring to FIGS. 10 to 14, the robot cleaner 100 may include a main body 101 and a sub body 103.

Constituent elements for implementing the functions of the robot cleaner 100 may be provided inside and outside the main body 101 and the sub body 103.

In more detail, the robot cleaner 100 may include a user interface 120 to interact with a user; an image acquisition unit 130 to obtain a peripheral image of the robot cleaner 100; an obstacle sensing unit 140 to sense an obstacle (O); a traveling unit 160 to move the robot cleaner 100; a cleaning unit 170 to clean the cleaning space; a storage node unit 180 to store program and various data therein; a light reception unit 190 to receive the infrared light emitted from the remote device 200; and a robot controller 110 to perform overall control of the robot cleaner 100.

As shown in FIG. 11, the user interface 120 may be provided at the top surface of the main body 101 of the robot cleaner 100, and may include an input button 121 to receive a control command from a user, and a display 123 to display the operation information of the robot cleaner 100.

The input button 121 may include a power button 121a for turning the robot cleaner 100 on or off, an operation/stop button 121b for operating/stopping the robot cleaner 100, and a return button 121c for controlling the robot cleaner 100 to move back to a charging station (not shown).

In addition, respective buttons contained in the input button unit 121 may include a push switch for sensing user's pressure, a membrane switch, or a touch switch for sensing contact of some parts of a user's body.

The display 123 may display information of the robot cleaner 100 in response to the user-input control command. For example, the display 123 may display an operation state of the robot cleaner 100, a power-supply state of the robot cleaner 100, a user-selected cleaning mode, and information indicating whether the robot cleaner returns to the charging station.

In addition, the display 123 may include a self-emission-type light emitting diode (LED), an organic light emitting diode (OLED), a liquid crystal display having a separate light source, etc.

Although not shown in the drawings, the user interface 120 may include a touch screen panel (TSP) configured to receive a control command from the user as well as to display the operation information corresponding to the received control command.

The TSP may include a display for displaying operation information and user-input control commands, a touch panel for detecting coordinates contacting some parts of a user's body, and a touchscreen controller for determining the user-input control command on the basis of the contact coordinates detected by the TSP.

The image acquisition unit 130 may include a camera module 131 to obtain a peripheral image of the robot cleaner 100.

The camera module 131 may be provided at the top surface of the sub body 103 contained in the robot cleaner 100, and may include a lens to focus light emitted from an upper part of the robot cleaner 100 and an image sensor to convert the light into an electric signal.

In addition, the image sensor may include a Complementary Metal Oxide Semiconductor (CMOS) sensor or a Charge Coupled Device (CCD) sensor.

Specifically, the camera module 131 may convert the peripheral image of the robot cleaner 100 into an electric signal capable of being processed by the robot controller 110, and may transmit the electric signal corresponding to a top view to the robot controller 110. The image provided from the image acquisition unit 130 may be used when the robot controller 110 detects the position of the robot cleaner 100.

The obstacle sensing unit 140 may detect the obstacle (O) obstructing movement of the robot cleaner 100.

In this case, the obstacle (O) may indicate objects or things that protrude from the bottom of the cleaning space and obstruct movement of the robot cleaner 100. For example, the obstacle (O) may include furniture such as a table or sofa, and may also include the surface of a wall through which the cleaning space is divided.

The obstacle sensing unit 140 may include a light emission module 141 to emit the light to the front of the robot cleaner 100; a light reception module 143 to receive the light reflected from the obstacle (O); and a light sensor module 145 to emit the light to a side of the robot cleaner 100 and to receive the light reflected from the obstacle (O).

Although the robot cleaner 100 according to the embodiment is configured to use light such as infrared light so as to detect the obstacle (O), the scope or spirit of the present invention is not limited thereto, and the robot cleaner 100 may use ultrasonic waves or radio waves.

As shown in FIGS. 12 and 13, the light emission module 141 may include a light source 141a to emit the light, and a wide-angle lens 141b to diffuse the emitted light in a direction parallel to the floor to be cleaned.

The light source 141a may include a light emitting diode (LED) emitting the light in various directions, or a Light Amplification by Simulated Emission of Radiation (LASER) diode.

The wide-angle lens 141b may be formed of a light transmission material, and may diffuse the light emitted from the light source 141a into the direction parallel to the floor to be cleaned using refraction or total reflection. The light emitted from the light emission module 141 may be diffused in a fan shape to the front of the robot cleaner 100. Hereinafter, the above-mentioned light is diffused in a direction parallel to the floor to be cleaned so that the light has a fan shape. For convenience of description and better understanding of the present disclosure, the above-mentioned light will hereinafter be referred to as plane light.

In addition, as can be seen from FIGS. 12 and 13, the obstacle sensing unit 140 may include a plurality of light emission modules 141 in such a manner that a specific part at which the plane light emitted from the light emission module 141 does not arrive has a minimum size.

The light reception module 143 may include a reflective mirror 143a to focus the light emitted from the obstacle (O), and an image sensor 143b to receive the light reflected from the reflective mirror 143a.

As shown in FIGS. 12 and 13, the reflective mirror 143a may be provided over the image sensor 143a, and may have a cone shape, a vertex of which faces the image sensor 143a. The reflective mirror 143a may allow the light reflected from the obstacle (O) to face the image sensor 143b.

The image sensor 143b may be provided below the reflective mirror 143a, and may receive the light reflected from the reflective mirror 143a. In more detail, the image sensor 143a may obtain a two-dimensional image formed at the reflective mirror 143a through the light reflected from the obstacle (O). In this case, the image sensor 143a may be comprised of a two-dimensional (2D) image sensor in which optical sensors are two-dimensionally arranged.

Preferably, the image sensor 143b may be an image sensor 143b that is capable of receiving the light having the same wavelength as that of the light source 143a of the light emission module 141. For example, if the light source 141a emits the infrared light, the image sensor 143b is preferably an image sensor capable of obtaining an image of the infrared region.

In addition, the image sensor 143b may include a CMOS sensor or a CCD sensor.

The number of light reception modules 143 may be different from the number of light emission modules 141. As described above, the light emission module 141 may diffuse the light emitted from the light source 141a in various directions using the wide-angle lens 141b, and the light reception module 143 may focus light beams of various directions into the image sensor 143a using the reflective mirror 143a, so that the obstacle sensing unit 140 may include different numbers of light emission modules 141 and light reception modules 143.

The light sensor module 145 may include a left light sensor module 145a and a right light sensor module 145b. The left light sensor module 145a may obliquely emit the light to the left of the robot cleaner 100, and receive the light reflected from the obstacle (O). The right light sensor module 145b may obliquely emit the light to the right of the robot cleaner 100, and receive the light reflected from the obstacle (O).

The light sensor module 145 may detect the obstacle (O) and may also be used to perform traveling of the robot cleaner 100. For example, during the outline tracing traveling mode in which the robot cleaner 100 travels simultaneously while maintaining a predetermined distance with the obstacle (O), the light sensor module 145 may detect the distance between the obstacle (O) and the side of the robot cleaner 100, and the robot cleaner 110 may control the traveling unit 160 on the basis of the detection result of the light sensor module 145 in such a manner that a predetermined distance between the robot cleaner and the obstacle (O) can be maintained.

The light sensor module 145 may assist a light emission module 141 and a light sensor module 145 that are configured to detect the obstacle (O) located forward of the robot cleaner 100. If necessary, the light sensor module 145 may not include the light sensor module 145.

The traveling unit 160 may move the robot cleaner 100. The traveling unit 160 may include a wheel-driving motor 161, a traveling wheel 163, and a caster wheel 165 as shown in FIGS. 12 to 14.

The traveling wheel 163 may be provided at both sides of the bottom surface of the main body 101, may include a left traveling wheel 163a arranged to the left side of the robot cleaner 100 on the basis of the front part of the robot cleaner 100, and may further include a right traveling wheel 163b arranged to the right side of the robot cleaner 100.

In addition, the traveling wheel 163 may receive rotational force from the wheel-driving motor 161 and move the robot cleaner 100 using the received rotational force.

The wheel-driving motor 161 may generate the rotational force needed to rotate the traveling wheel 163, and may include a left driving motor 161a for rotating the left traveling wheel 163a and a right driving motor 161b for rotating the right traveling wheel 163b.

Each of the left driving motor 161a and the right driving motor 161b may receive a drive control signal from the robot controller 110, so that the left driving motor 161a and the right driving motor 161b can be operated independently from each other.

By the left driving motor 161a and the right driving motor 161b, the left traveling wheel 163a and the right traveling wheel 163b may rotate independently.

In addition, since the left traveling wheel 163a and the right traveling wheel 163b can rotate independently, the cleaning robot 100 may move or travel in various ways (e.g., forward movement, backward movement, rotation, and rotation in place).

For example, if the right and left traveling wheels (163a, 163b) rotate in a first direction, the robot cleaner 100 performs straight traveling in a forward direction. If the right and left traveling wheels (163a, 163b) rotate in a second direction, the main body 101 may perform straight traveling in a backward direction.

In addition, the right and left traveling wheels (163a, 163b) may rotate in the same direction. If the right and left traveling wheels (163a, 163b) rotate at different speeds, the robot cleaner 100 rotates in the right or left direction. If the right and left traveling wheels (163a, 163b) rotate in different directions, the robot cleaner 100 may rotate clockwise or counterclockwise in place.

The caster wheel 165 is installed at the bottom of the main body 101, so that the rotation axis of the caster wheel 165 may rotate in response to the movement direction of the robot cleaner 100. The caster wheel 165 having a rotation axis that rotates in response to the movement direction of the robot cleaner 100 does not disturb traveling of the robot cleaner 100, and the robot cleaner 100 can travel while maintaining a stable posture.

In addition, the traveling unit 160 may include a motor drive circuit (not shown) for providing drive current to the wheel drive motor 161 in response to a control signal of the robot controller 110; a power transmission module (not shown) for providing rotation force of the wheel drive motor 161 to the traveling wheel 163; and a rotation sensor (not shown) for detecting rotational displacement and rotation speed of the wheel drive motor 161 or the traveling wheel 163.

The cleaning unit 170 may include a drum brush 173 for scattering dirt or dust from the floor to be cleaned; a brush drive motor 171 for rotating the drum brush 173; a dust suction fan 177 for sucking the scattered dust; a dust suction motor 175 for rotating the suction fan 177; and a dust box 179 for storing the sucked dust.

As shown in FIG. 14, the drum brush 173 is provided at the dust inlet 105 formed at the bottom of the sub body 103, and rotates about the rotation axis provided in a direction parallel to the floor to be cleaned, so that the dust from the floor to be cleaned is scattered into the dust inlet 105.

The brush drive motor 171 is arranged adjacent to the drum brush 173, so that it rotates the drum brush 173 in response to the cleaning control signal of the robot cleaner 110.

Although not shown in the drawings, the cleaning unit 170 may further include a motor drive circuit (not shown) to provide a drive current to the brush drive motor 171 in response to a control signal of the robot controller 110; and a power transmission module (not shown) to transfer rotation force of the brush drive motor 171 to the drum brush 173.

As shown in FIGS. 12 and 13, the dust suction fan 177 is mounted to the main body 101 so that the dust scattered by the drum brush 173 is sucked into the dust box 179.

The dust suction motor 175 is arranged adjacent to the dust suction fan 177, and rotates the dust suction fan 177 in response to a control signal of the robot controller 110.

Although not shown in the drawings, the cleaning unit 170 may further include a motor drive circuit (not shown) for providing a drive current to the dust suction motor 175 in response to a control signal of the robot controller 110, and a power transmission module (not shown) for transferring rotation force of the suction motor 175 to the dust suction fan 177.

As shown in FIGS. 12 and 13, the dust box 179 is provided at the main body 101, and may store the dust sucked by the suction fan 177.

In addition, the cleaning unit 170 may further include a dust guide pipe through which dust sucked through the dust inlet 105 is directed to the dust box 179 provided at the main body 101.

The storage unit 180 may store control programs and control data needed to control the robot cleaner 100, and may further store the cleaning space's map information obtained while the robot cleaner 100 travels.

The storage unit 180 may act as an auxiliary memory device configured to assist the memory 115 contained in the robot controller 110 to be described later. The storage unit 180 may be comprised of a non-volatile storage medium, stored data of which is not erased even when the robot cleaner 100 is powered off.

The storage unit 180 may include a semiconductor-device drive 181 for storing data in a semiconductor device, and a magnetic disk drive 183 for storing data on a magnetic disk.

The light reception unit 190 may include a plurality of infrared (IR) receivers (191a, 191b, 191c, 191d, 191e, 191f: 191) configured to receive infrared light emitted from the remote device 200, and an infrared demodulator 193 configured to obtain a user control command by demodulating the infrared light received by the plurality of IR receivers (191a~191f).

The IR receivers (191a~191f) may include a left-rear IR receiver 191a provided at a left-rear side; a left IR receiver 191b provided at the left side; a left-front IR receiver 191c provided at a left-front side; a right-front IR receiver 191d provided at a right-front side; a right IR receiver 191e provided at a right side; and a right-rear IR receiver 191f provided at a right-rear side.

The IR receivers (191a~191f) may be arranged along the outline of the robot cleaner 100, so that they receive the infrared light propagated in all directions. In addition, the robot cleaner 100 may recognize the position (i.e., the position of light spot (LS)) indicated by the remote device 200 according to the position of a specific IR receiver receiving the infrared light emitted from the remote device 200, from among the plurality of IR receivers (191a~191f).

A method for recognizing the position (i.e., the LS position) indicated by the remote device 200 according to the position of the IR receiver that receives the infrared light from the remote device 200 will hereinafter be described in detail.

The infrared demodulator 193 may demodulate the infrared light received by the infrared receiver 191. The infrared modulator 295 contained in the remote device 200 may modulate the infrared light according to a control command of the user. The infrared demodulator 193 of the robot cleaner 100 may demodulate the infrared light modulated by the remote device 200, and may obtain a control command of the user.

In addition, the infrared demodulator 193 may output the obtained control command to the robot controller 110.

The robot controller 110 may provide overall control to the robot cleaner 100.

In more detail, the robot controller 110 may include an Input/Output (I/O) interface 117 for intermediating data I/O communication between the robot controller 110 and various constituent elements contained in the robot cleaner 100; a memory 115 for storing programs and data; a graphic processor 113 for image processing; a main processor 111 for performing the operation in response to the program and data stored in the memory 113; and a system bus 119 used as a path of data communication among the I/O interface 117, the memory 115, the graphic processor 113, and the main processor 111.

The I/O interface 117 may receive images received from the image acquisition unit 130, the sensing result of an obstacle sensed by the obstacle sensing unit 140, and the sensing result of contact sensed by a contact sensing unit 150. The I/O interface 117 may output the received images, the obstacle sensing result, the contact sensing result, etc. to the main processor 111, the graphics processor 113, the memory 115, etc.

In addition, the I/O interface 117 may transmit various control signals generated from the main processor 111 to the traveling unit 160 or the cleaning unit 170.

The memory 115 may retrieve the control program and control data needed for controlling the robot cleaner 100 from the storage unit 180, may store the retrieved control program and control data, and may temporarily store the images obtained by the image acquisition unit 130 or the sensing result of an obstacle sensed by the obstacle sensing unit 140.

The memory 115 may include volatile memories such as SRAM, DRAM, or the like. However, the scope or spirit of the present invention is not limited thereto. If necessary, the memory 115 may include non-volatile memories, for example, a flash memory, a Read Only Memory (ROM), an Erasable Programmable Read Only Memory (EPROM), an Electrically Erasable Programmable Read Only Memory (EEPROM), etc.

The graphics processor 113 may convert the image acquired from the image acquisition unit 130 into a format capable of being stored in the memory 115 or the storage unit 180, or may change the resolution or size of the image acquired from the image acquisition unit 130.

In addition, the graphics processor 113 may also convert the reflection light obtained by the obstacle sensing unit 150 into a form capable of being processed by the main processor 111.

The main processor 111 may process the sensing results obtained from the image acquisition unit 130, the obstacle sensing unit 140, and the contact sensing unit 150 according to the program and data stored in the memory 115, or may perform the operation for controlling the traveling unit 160 and the cleaning unit 170.

For example, the main processor 111 may calculate the position of the robot cleaner 100 on the basis of the image obtained from the image acquisition unit 130, or may calculate the direction, distance, and size of the obstacle on the basis of the image acquired from the obstacle sensing unit 150.

In addition, the main processor 111 may perform operations needed to determine whether the obstacle (O) will be avoided according to the direction, distance, and size of the obstacle (O), or to determine whether the robot cleaner 100 will contact the obstacle (O). If it is expected that the robot cleaner 100 will avoid the obstacle (O), the main processor 111 may calculate the traveling path for avoiding the obstacle (O). If it is expected that the robot cleaner 100 will contact the obstacle (O), the main processor 111 may calculate the traveling path for arranging the obstacle (O) and the robot cleaner 100.

In addition, the main processor 111 may generate the traveling control data to be provided to the traveling unit 160 in such a manner that the robot cleaner 100 can move along the calculated traveling path.

The robot controller 110 may control the robot cleaner 100 to travel on the floor to be cleaned, and may control the cleaning unit 170 during traveling of the robot cleaner 100 in such a manner that the robot cleaner 100 cleans the floor.

In addition, the robot controller 110 may detect the position, size, etc. of the obstacle (O) on the basis of the obstacle sensing signal of the obstacle sensing unit 140.

The following detailed operation of the robot cleaner 100 may be interpreted as a control operation of the robot controller 110.

A method for allowing the obstacle sensing unit 140 to detect the obstacle (O) will hereinafter be described with reference to the attached drawings.

Figure 15:
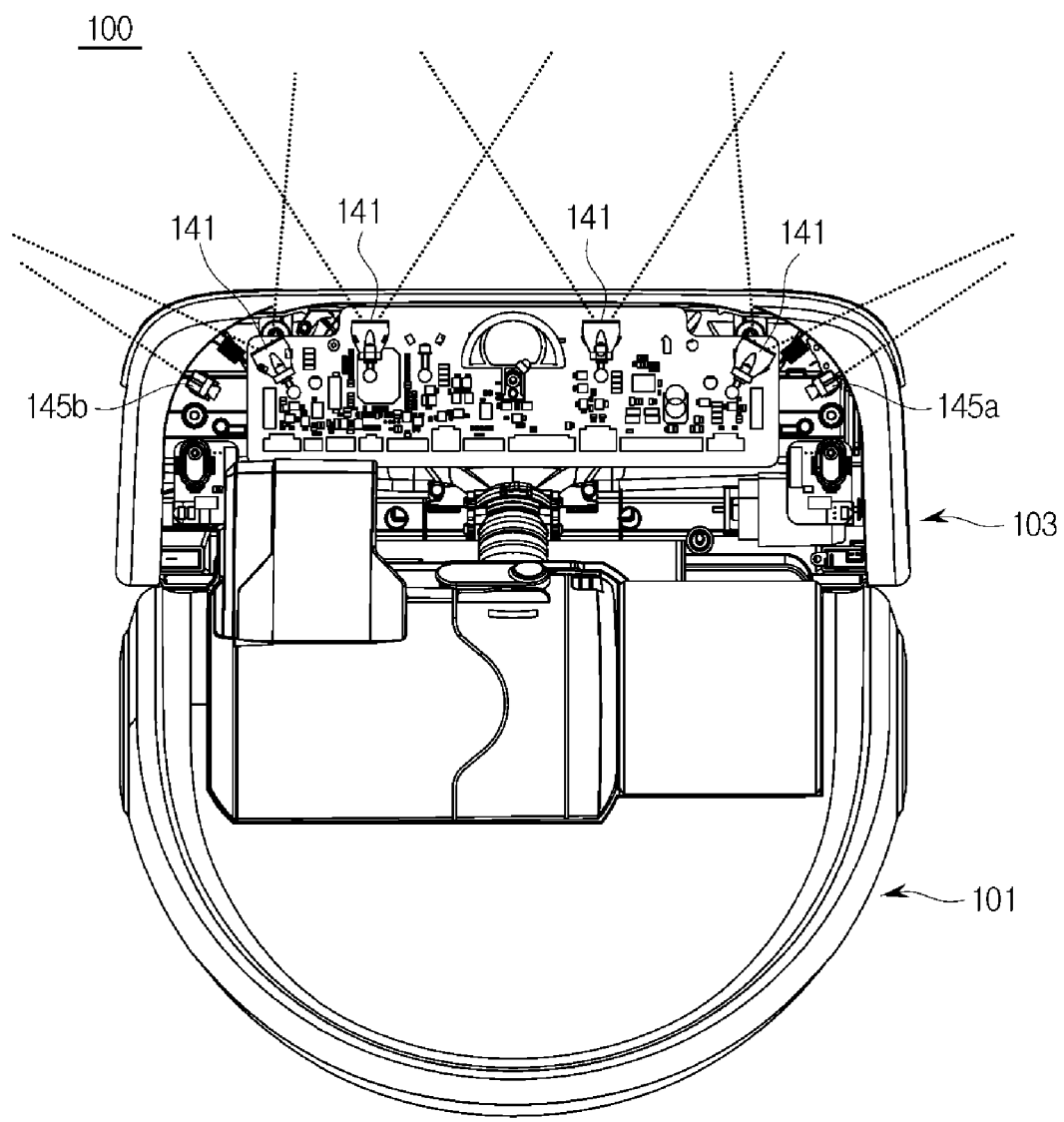
FIG. 15 exemplarily illustrates that an obstacle sensing unit contained in the robot cleaner emits light according to an embodiment of the present disclosure.
Figure 16:
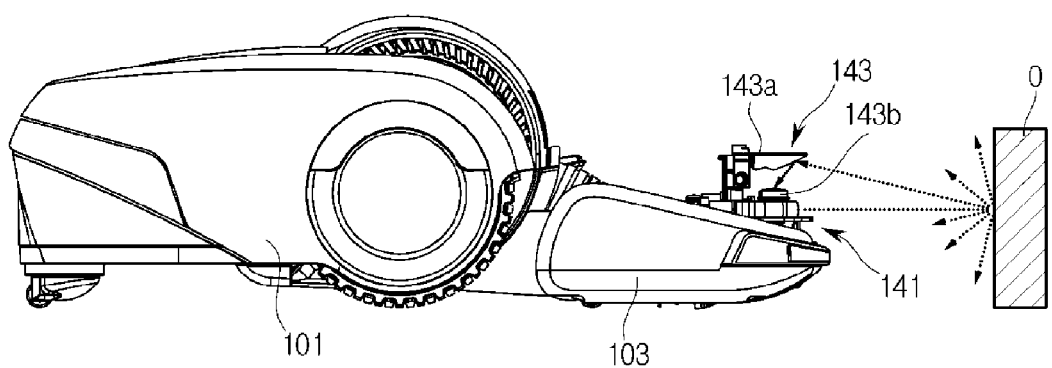
FIG. 16 exemplarily illustrates that an obstacle sensing unit contained in the robot cleaner receives light reflected from an obstacle.

FIG. 15 exemplarily illustrates that the obstacle sensing unit contained in the robot cleaner emits light according to an embodiment of the present disclosure. FIG. 16 exemplarily illustrates that the obstacle sensing unit contained in the robot cleaner receives light reflected from an obstacle.

As described above, the obstacle sensing unit 140 may include a light emission module 141, a light reception module 143, and a light sensor module 145.

The light emission module 141 contained in the obstacle sensing unit 140 may emit the light in a forward direction of the robot cleaner 100, and the light emitted in the forward direction by the light emission module 141 may be diffused in a fan shape as shown in FIG. 15.

If the obstacle (O) is not located forward of the robot cleaner 100, the light emitted from the light emission module 141 travels toward the front part of the robot cleaner 100, so that the light reception module 143 may not receive the light reflected from the obstacle (O).

If the obstacle (O) is located forward of the robot cleaner 100, the light will be reflected from the obstacle (O). In this case, the light reflected from the obstacle (O) may be reflected in various directions as shown in FIG. 16, and this reflection will hereinafter be referred to as "diffuse reflection".

Some parts from among the reflection light reflected from the obstacle (O) may be directed to the light reception module 143 of the robot cleaner 100 as shown in FIG. 16.

The reflection light proceeding to the light reception module 143 may be reflected from the reflective mirror 143a, the light traveling path faces the image sensor 143b, and the image sensor 143b may receive the reflection light reflected from the reflective mirror 143a.

In this case, since the reflection light is reflected from various positions of the obstacle (O), the image sensor 143b may obtain a reflected-light image, and the obstacle sensing unit 140 may calculate the distance and direction to the obstacle (O).

In more detail, an incident angle, at which the light reflected from the obstacle (O) is incident on the reflective mirror 143a, may be changed according to a distance between the light emission module 143 and the obstacle (O). In addition, the light incident on the reflective mirror 143a at different angles of incidence may be received at different positions of the image sensor 143b. As a result, the position at which the image sensor 143b receives the reflection light becomes different in response to a distance between the light emission module 143 and the obstacle (O). That is, the reflected-light image obtained by the image sensor 143b may be changed according to the distance between the light emission module 143 and the obstacle (O).

For example, the light reflected from the obstacle (O) located distant from the robot cleaner 100 may be formed at a specific part in which the incident angle of the reflective mirror 143a is a high value. Here, the specific part is located distant from a vertex of the reflective mirror 143a, so that the reflected-light image will be formed at the specific part. In addition, the light reflected from the obstacle (O) located near the robot cleaner 100 may be formed at a specific part in which the incident angle of the reflective mirror 143a is low. Here, the specific part is located near the vertex of the reflective mirror 143a, so that the reflected-light image will be formed at the specific part.

The position of light incident on the reflective mirror 143a where the light reflected from the obstacle (O) is incident is changed according to the direction of the obstacle (O). In addition, the light reflected from different positions of the reflective mirror 143a may be received at different positions of the image sensor 143b. As a result, the position at which the image sensor 143b receives the reflection light varies according to the direction to the obstacle (O). That is, the reflected-light image obtained by the image sensor 143b becomes different according to the direction to the obstacle (O) on the basis of the position of the robot cleaner 100.

As described above, the robot cleaner 100 may calculate the direction and distance of the obstacle (O) in response to the reflected-light image received by the image sensor 143b.

Although the above-mentioned embodiment has exemplarily disclosed not only the light emission module 141 including the light source 141a and the wide-angle lens 141b, but also the light reception module 143 including the reflective mirror 143a and the image sensor 143b for convenience of description and better understanding of the present disclosure, the scope or spirit of the light emission module 141 and the light reception module 143 is not limited thereto.

For example, the obstacle sensing unit 140 may emit the rectilinear light in the forward direction, and may detect the position of the obstacle (O) using the light reflected from the obstacle (O).

The light sensor module 145 may emit the rectilinear light in a lateral direction of the robot cleaner 100, and may receive the light reflected from the obstacle (O) located at a side of the robot cleaner 100.

In addition, the light sensor module 145 may transmit information related to the received reflection light to the controller 110, and the controller 110 may calculate a distance between the robot cleaner 100 and the obstacle (O) on the basis of the information related to the reflection light.

For example, the light sensor module 145 may transmit information regarding the intensity of the received reflection light to the controller 110, and the controller 110 may calculate the distance between the robot cleaner 100 and the obstacle (O) on the basis of the reflection-light intensity. In more detail, the controller 110 may determine that the distance between the robot cleaner 100 and the obstacle (O) is gradually reduced in proportion to the increasing reflection light intensity, and may determine that the distance between the robot cleaner 100 and the obstacle (O) is gradually increased in inverse proportion to the reflection light intensity.

In another example, the light sensor module 145 may transmit a time of flight (TOF) difference between the emitted light and the received reflection light to the controller 110, and the controller 110 may calculate the distance between the robot cleaner 100 and the obstacle (O) on the basis of the TOF value. In more detail, the controller 110 may determine that the distance between the robot cleaner 100 and the obstacle (O) is gradually reduced in inverse proportion to the TOF value, and may determine that the distance between the robot cleaner 100 and the obstacle (O) is gradually increased in proportion to the TOF value.

In another example, the light sensor module 145 may transmit the distance between the emission position of the emitted light and the reception position of the reflection light to the controller 110. The controller 110 may calculate the distance between the robot cleaner 100 and the obstacle (O) on the basis of the distance between the light emission position and the light reception position. In more detail, the controller 110 may determine that the distance between the robot cleaner 100 and the obstacle (O) is gradually reduced in inverse proportion to the distance between the light emission position and the light reception position, and may determine that the distance between the robot cleaner 100 and the obstacle (O) is gradually increased in proportion to the increasing distance between the light emission position and the light reception position.

A method for allowing the robot cleaner 100 to detect the LS (Light Spot) position will hereinafter be described in detail.

Figure 17:
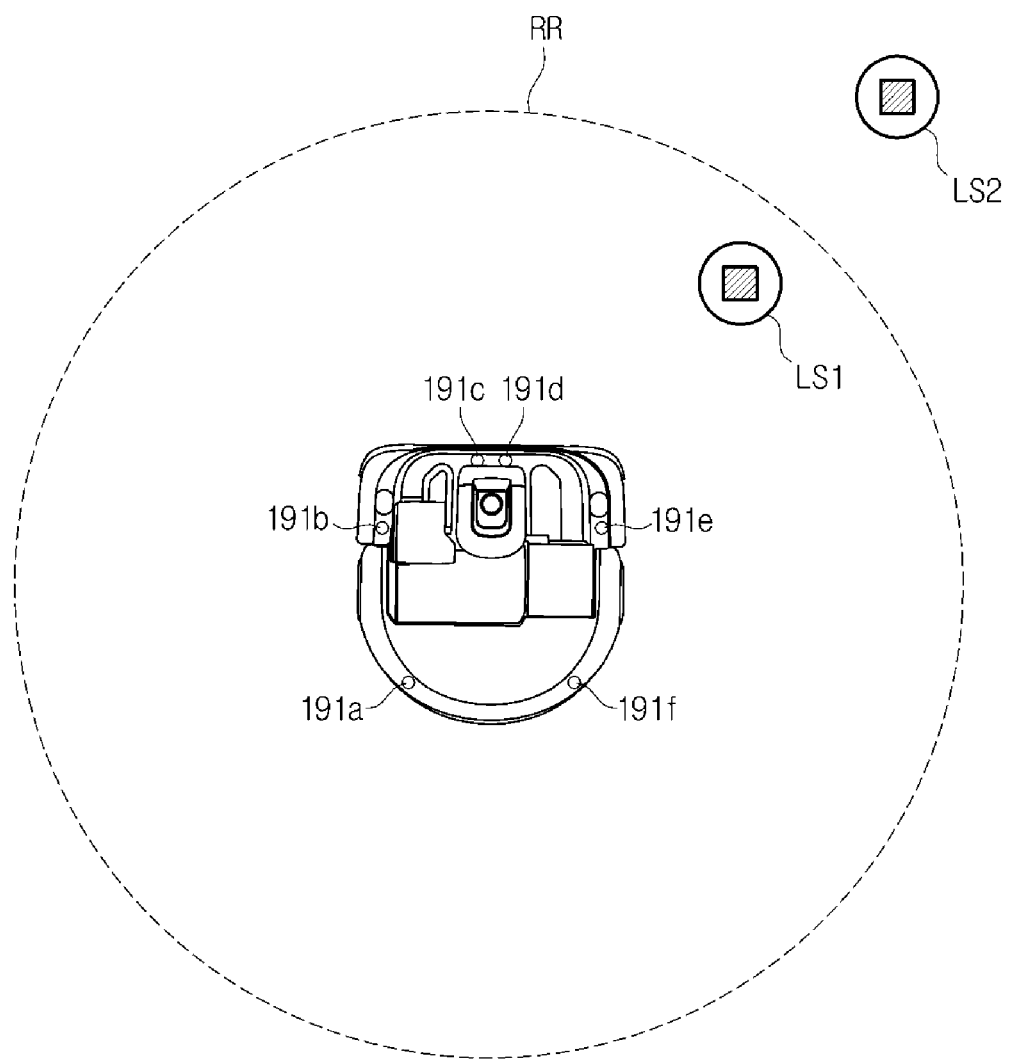
FIG. 17 exemplarily illustrates an infrared sensing region in which the robot cleaner can detect infrared light emitted from the remote device according to an embodiment of the present disclosure.
Figure 18:
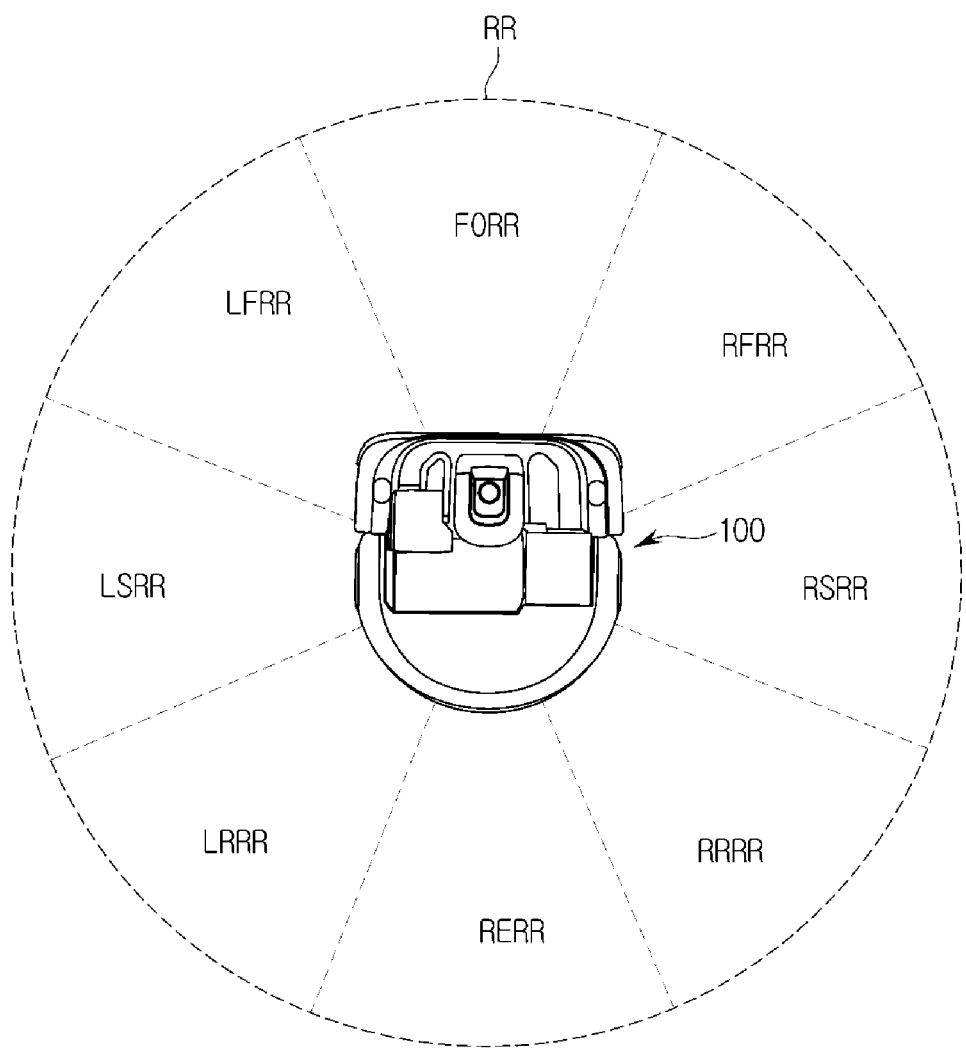
FIG. 18 exemplarily illustrates a plurality of divided infrared sensing regions in which the robot cleaner can detect the position of a light spot according to an embodiment of the present disclosure.
Figure 19:
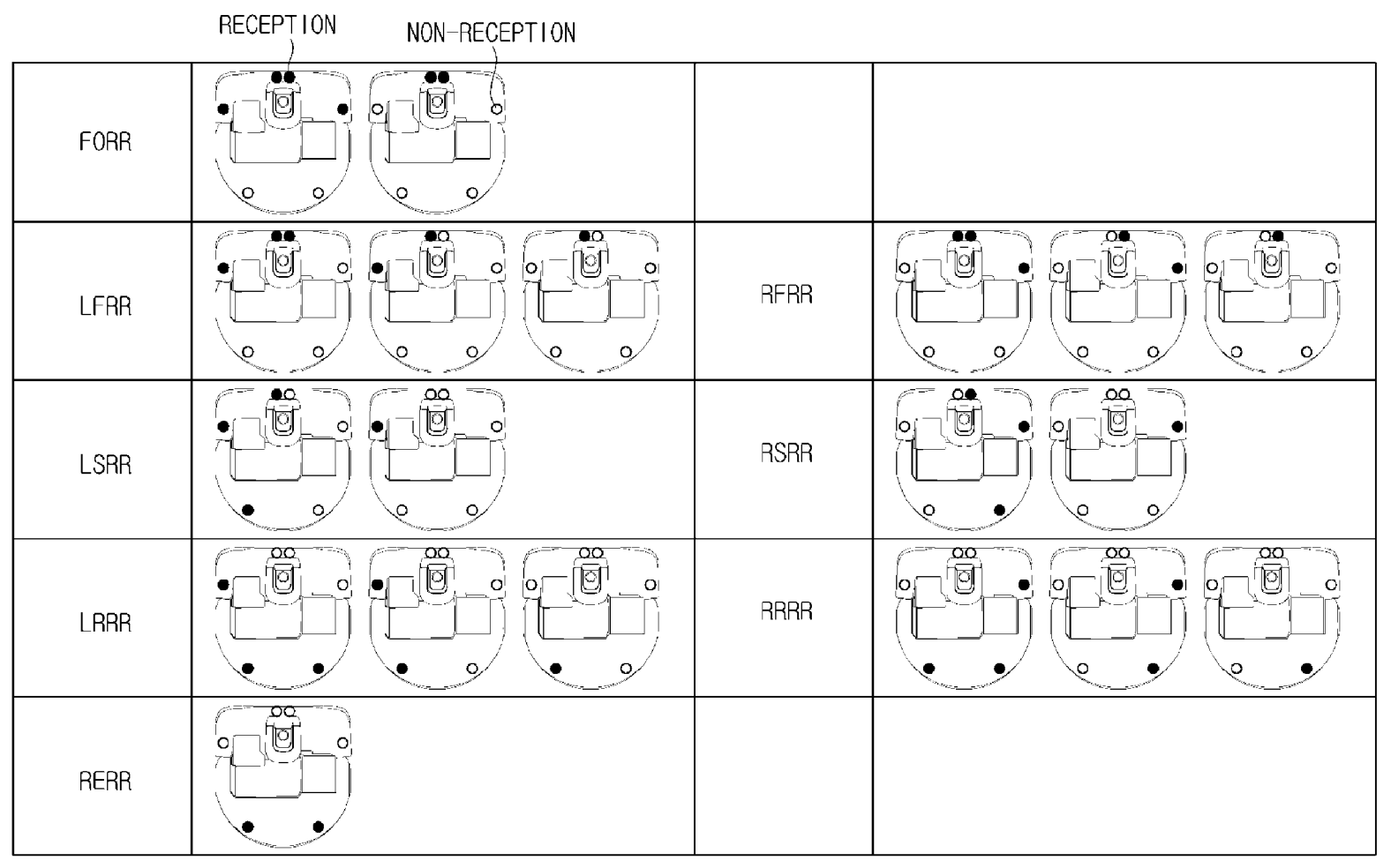

FIG. 17 exemplarily illustrates an infrared sensing region in which the robot cleaner can detect infrared light emitted from the remote device according to an embodiment of the present disclosure. FIG. 18 exemplarily illustrates a plurality of divided infrared sensing regions in which the robot cleaner can detect the position of a light spot according to an embodiment of the present disclosure. FIG. 19 exemplarily illustrates a method for allowing the robot cleaner to detect the position of a light spot according to types of an infrared receiver receiving infrared light.

As described above, if the user moves the robot cleaner 100 using the remote device 200, the remote device 200 may emit the infrared light to the position at which the robot cleaner 100 will arrive, and the robot cleaner 100 may receive the infrared light reflected from the floor indicated by the remote device 200.

The reflected infrared light may have a shorter propagation distance than the infrared light directly emitted from the remote device 200, and the robot cleaner 100 may receive the infrared light reflected from the infrared reception region (RR) shown in FIG. 17, and may not receive the infrared light reflected from the outside of the infrared reception region (RR).

In more detail, if the light spot (LS) is located in the infrared reception region (RR), the robot cleaner 100 may receive a control command from the user, and may detect the LS position. For example, as shown in FIG. 17, although the robot cleaner 100 can detect a first light spot (LS1) located in the RR, it may not detect a second light spot (LS2) located outside of the infrared reception region (RR).

In addition, the robot cleaner 100 may detect the LS position according to the infrared (IR) receiver configured to receive the infrared light from the remote device 200 from among a plurality of IR receivers (191a, 191b, 191c, 191d, 191e, 191f) contained in the light reception unit 190.

The robot cleaner 100 may divide the infrared reception region (RR) in which the robot cleaner 100 can receive the infrared light, into a plurality of IR reception regions.

For example, the infrared reception region (RR) may be divided into 8 reception regions as shown in FIG. 19.

In more detail, the infrared reception region (RR) may be divided into a front reception region (FORR) located forward of the robot cleaner 100, a right-front reception region (RFRR) located at the right-front side of the robot cleaner 100, a right reception region (RSRR) located at the right side of the robot cleaner 100, a right-rear reception region (RRRR) located at the right side of the robot cleaner 100, a right reception region (RERR) located backward of the robot cleaner 100, a left-rear reception region (LRRR) located at the left-rear side of the robot cleaner 100, a left reception region (LSRR) located at the left side of the robot cleaner 100, and a left-front reception region (LFRR) located at the left-front side of the robot cleaner 100.

In addition, the robot cleaner 100 may determine a specific region in which the LS is located on the basis of the position of the IR receiver receiving the infrared light.

For example, if the left-front IR receiver 191c and the right-front IR receiver 191d receive infrared light as shown in FIG. 19, the robot cleaner 100 may determine that the light spot (LS) is located in the FORR region. That is, the robot cleaner may determine that the remote device 200 indicates the FORR region. In addition, if the left-front IR receiver 191c and the right-front IR receiver 191d receive the infrared light and at the same time the left IR receiver 191b and the right IR receiver 191e receive the infrared light, the robot cleaner 100 may determine that the LS is located in the FORR region.

If the right-front IR receiver 191d receives the infrared light, the robot cleaner 100 may determine that the LS is located in the RFRR region. In addition, if the right-front IR receiver 191d and the right IR receiver 191e receive the infrared light, or if the right-front IR receiver 191d, the right IR receiver 191e and the right-front IR receiver 191c receive the infrared light, the robot cleaner 100 may also determine that the LS is located in the RFRR region.

If the right IR receiver 191e receives the infrared light, the robot cleaner 100 may determine that the LS is located in the RSRR region. In addition, if the right IR receiver 191e, the right-front IR receiver 191d and the right-rear IR receiver 191f receive the infrared light, the robot cleaner 100 may also determine that the LS is located in the RSRR region.

If the right-rear IR receiver 191f receives the infrared light, the robot cleaner 100 may determine that the LS is located in the RRRR region. In addition, if the right-rear IR receiver 191f and the right IR receiver 191e receive the infrared light, or if the right-rear IR receiver 191f, the right IR receiver 191e and the left IR receiver 191a receive the infrared light, the robot cleaner 100 may determine that the LS is located in the RRRR region.

If the left-rear IR receiver 191a and the right-rear IR receiver 191e receive the infrared light, the robot cleaner 100 may determine that the LS is located in the RERR region.

If the left-rear IR receiver 191a receives the infrared light, the robot cleaner 100 may determine that the LS is located in the LRRR region. In addition, if the left-rear IR receiver 191a and the left IR receiver 191b receive the infrared light, or if the left-rear IR receiver 191a, the left IR receiver 191b and the right-rear IR receiver 191e receive the infrared light, the robot cleaner 100 may also determine that the LS is located in the LRRR region.

If the left IR receiver 191b receives the infrared light, the robot cleaner 100 may determine that the LS is located in the LSRR region. In addition, if the left IR receiver 191b, the left-rear IR receiver 191a and the left-front IR receiver 191c receive the infrared light, the robot cleaner 100 may determine that the LS is located in the left reception region (LSRR).

If the left-front IR receiver 191c receives the infrared light, the robot cleaner 100 may determine that the LS is located in the LFRR region. In addition, if the left-front IR receiver 191c and the left IR receiver 191b receive the infrared light, or if the left-front IR receiver 191c, the left IR receiver 191b and the right IR receiver 191d receive the infrared light, the robot cleaner 100 may also determine that the LS is located in the LFRR region.

Although the IR reception region (RR) is divided into 8 reception regions for convenience of description, the scope or spirit of the present disclosure is not limited thereto. For example, the RR region may also be divided into 7 or fewer reception regions or 9 or more reception regions.

In addition, the methods of FIGS. 18 and 19 are exemplary methods for detecting a specific position (LS position) indicated by the user who uses the remote device 200, the robot cleaner 100 may detect the user-indicated position in various ways.

For example, the robot cleaner 100 may calculate the distance between the LS and the plurality of IR receivers on the basis of intensity of infrared light received by the plural IR receivers, and may calculate relative coordinates of the LS, the origin (starting point) of which is set to the position of the robot cleaner 100, using a triangulation method or the like.

The above-mentioned description has exemplarily disclosed constituent elements of the robot cleaner 100.

The operation of the robot cleaner 100 will hereinafter be described with reference to the attached drawings.

Figure 20:
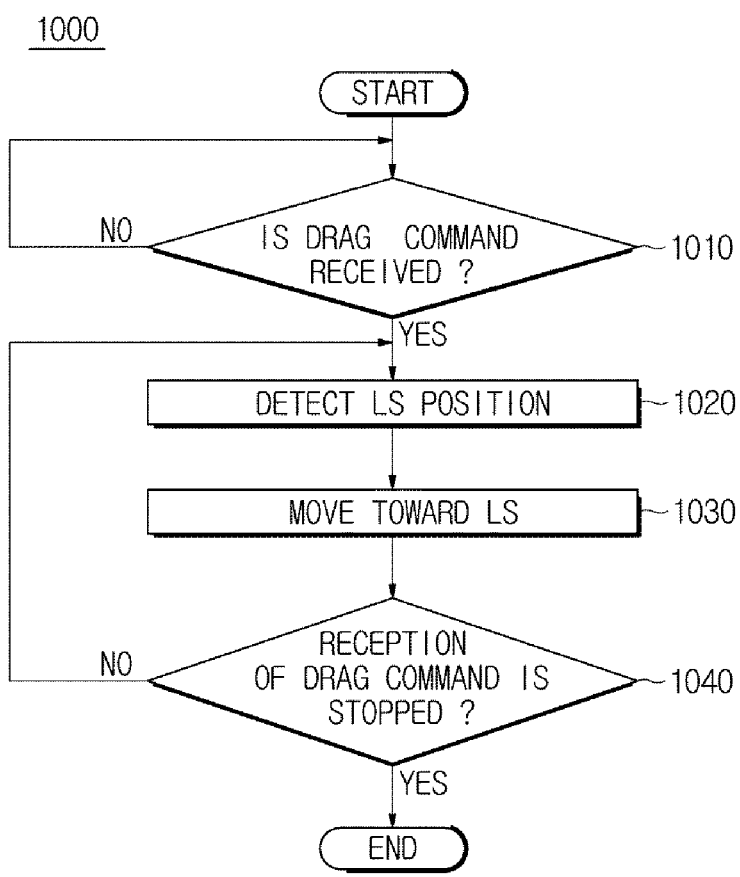
FIG. 20 is a flowchart illustrating drag traveling of the robot cleaner according to an embodiment of the present disclosure.

FIG. 20 is a flowchart illustrating a method for performing drag traveling of the robot cleaner according to an embodiment of the present disclosure. FIGS. 21A to 23E exemplarily illustrate methods for allowing the robot cleaner to trace a light spot (LS) according to an embodiment of the present disclosure.

Referring to FIGS. 20 to 23E, the drag traveling of the robot cleaner 100 will hereinafter be described in detail. In this case, the drag traveling 1000 may indicate that the robot cleaner 100 moves (or travels) to a user-indicated position indicated by the remote device 200.

The robot cleaner 100 may determine whether the drag command is received from the remote device 200 in operation S1010.

The user may input a drag command to the robot cleaner 100 using the input button unit 220 of the remote device 200.

If the user who points toward the position (i.e., the floor to be cleaned) at which the robot cleaner 100 will arrive inputs the drag command to the remote device 200, the remote device 200 may modulate the infrared light according to the drag command, and may emit the modulated infrared light and the visible light to the position to which the robot cleaner 100 will move.

As described above, the visible light and the infrared light emitted from the remote device 200 may form the light spot (LS) at a specific position at which the robot cleaner will arrive, and may be reflected from the bottom of the cleaning region.

The robot cleaner 100 may receive the infrared light reflected from the floor to be cleaned, through the light reception unit 190, and may obtain the drag command by demodulating the received infrared light.

If the drag command is not received in operation 1010, the robot cleaner 100 may continuously perform the previous operation.

If the drag command is received in operation 1010, the robot cleaner 100 may detect the LS position through the light reception unit 190 in operation 1020.

As described above, if the remote device 200 emits the infrared light to the floor to be cleaned, the robot cleaner 100 may receive the infrared light reflected from the floor through the light reception unit 190.

In addition, the robot cleaner 100 may divide the IR reception region (RR) in which the robot cleaner 100 receives the infrared light, into a plurality of regions. In accordance with the IR receiver having received the infrared light from the remote device 200 from among the plurality of IR receivers (191a~191f), it may be possible to determine the region in which the LS is located.

After detection of a relative position of the LS, the robot cleaner 100 may move to the detected LS in operation 1030.

After the robot cleaner 100 spins round and round in place in such a manner that the LS is located forward of the robot cleaner 100, the robot cleaner 100 then moves straight toward the LS.

Figure 21A:
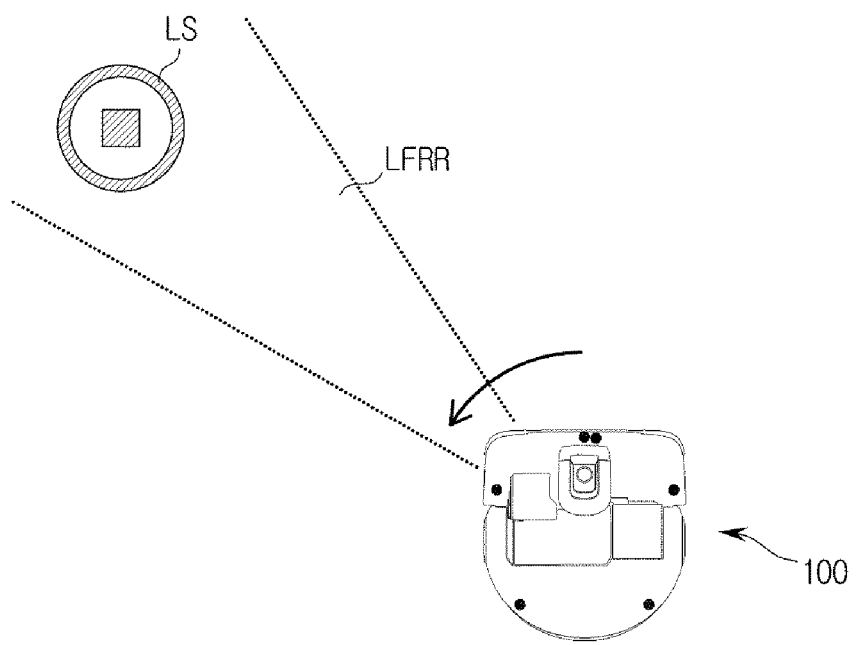
FIGS. 21A to 23E exemplarily illustrate methods for allowing the robot cleaner to trace a light spot according to an embodiment of the present disclosure.
Figure 21B:
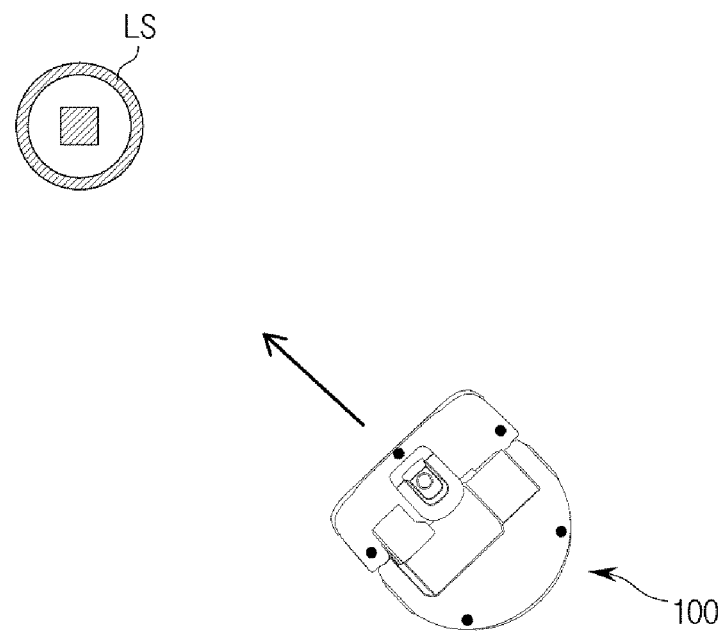

If the LS is located in the LFRR region, the robot cleaner 100 may rotate counterclockwise by about 45° toward the LS as shown in FIG. 21A. Thereafter, the robot cleaner 100 may move straight toward the LS 100 as shown in FIG. 21B.

In addition, the robot cleaner 100 may perform the curvilinear motion toward the LS by changing the linear velocity and the angular velocity of the robot cleaner 100 according to the LS position.

Figure 22A:
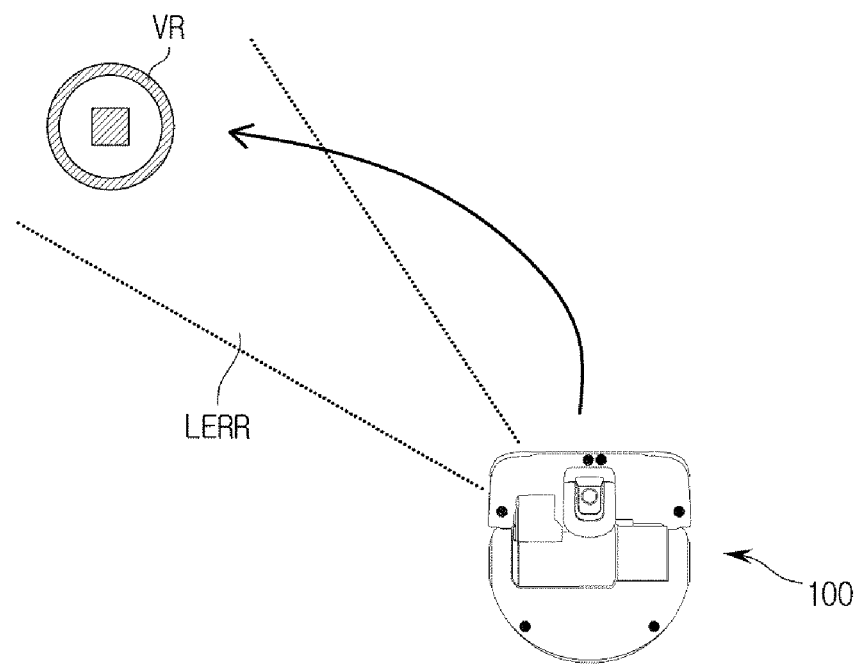
Figure 22B:
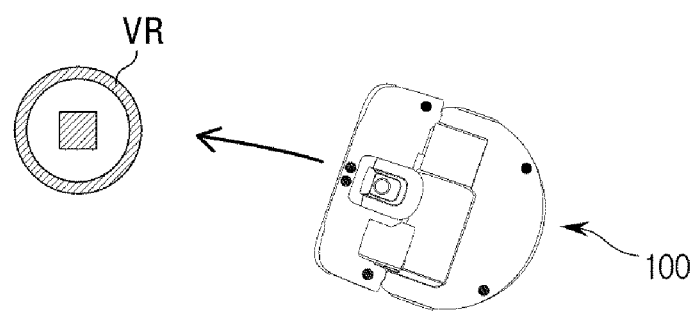

If the LS is located in the LFRR region, the robot cleaner 100 may perform the curvilinear motion toward the LS as shown in FIGS. 22A and 22B.

Figure 23A:
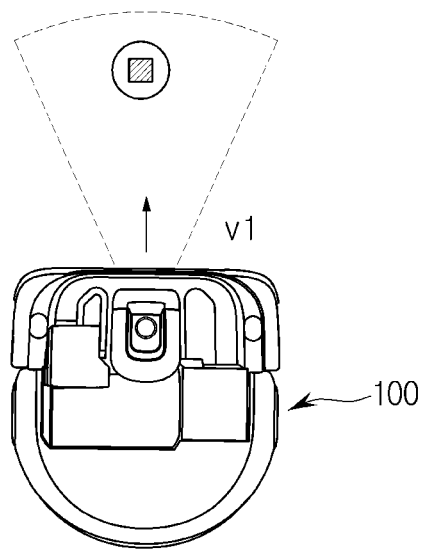

In more detail, if the LS is located in the FORR region as shown in FIG. 23A, the robot cleaner 100 may move at a first linear velocity (v1) and a first angular velocity ($\omega$1). In this case, the first angular velocity ($\omega$1) may be set to zero (0). In other words, the robot cleaner 100 may move straight toward the light spot (LS) at a first linear velocity (v1).

Figure 23B:
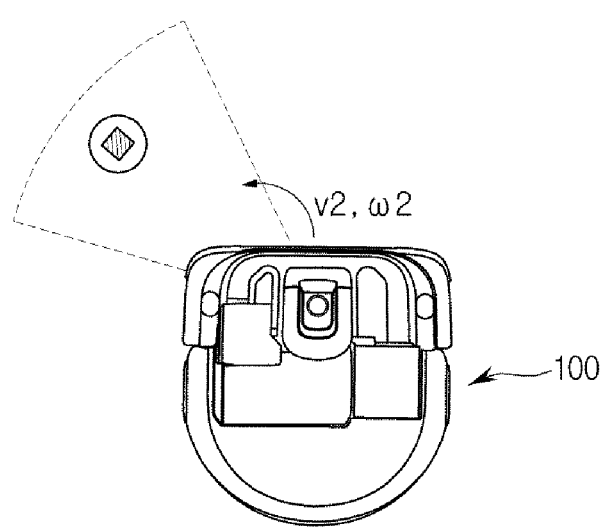

If the LS is located in the LFRR region as shown in FIG. 23B, the robot cleaner 100 may move at a second linear velocity (v2) and a second angular speed ($\omega$2).

In this case, the second linear velocity (v2) may be lower than the first linear velocity (v1), and the second angular velocity ($\omega$2) may be set to a value but not "0". In other words, the robot cleaner 100 may perform rotation traveling having a second radius of rotation (r2) corresponding a second linear velocity (v2) and a second angular velocity ($\omega$2).

Although not shown in the drawings, if the LS is located in the RFRR region, the robot cleaner 100 may move or travel in a different direction in the same manner as in the scheme of FIG. 23B.

Figure 23C:
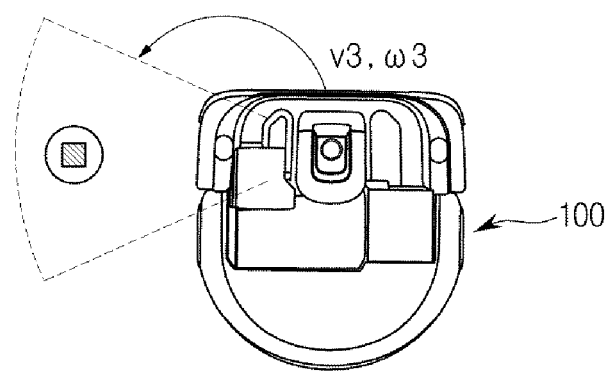

If the LS is located in the LSRR region as shown in FIG. 23C, the robot cleaner 100 may move at a third linear velocity (v3) and a third angular velocity ($\omega$3).

In this case, the third linear velocity (v3) is lower than the second linear velocity (v2), and the third angular velocity ($\omega$3) may be higher than the second angular velocity ($\omega$2). In other words, the robot cleaner 100 may perform rotation traveling having a third radius of rotation (r3) corresponding to a third linear velocity (v3) and a third angular velocity ($\omega$3), and the third radius of rotation (r3) is less than the second radius of rotation (r2).

Although not shown in the drawings, if the LS is located in the RSRR region, the robot cleaner 100 may move or travel along a different direction in the same manner as in the scheme of FIG. 23C.

Figure 23D:
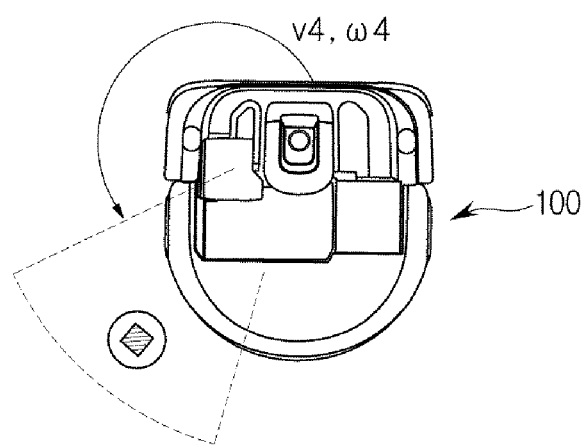

In addition, if the LS is located in the LRRR region as shown in FIG. 23D, the robot cleaner 100 may move or travel at a fourth linear velocity (v4) and a fourth angular velocity ($\omega$4).

In this case, a fourth linear velocity (v4) is lower than the above third linear velocity (v3), and a fourth angular velocity ($\omega$4) may be higher than the third angular velocity ($\omega$3). In other words, the robot cleaner 100 may perform rotation traveling having a fourth radius of rotation (r4) corresponding to a fourth linear velocity (v4) and a fourth angular velocity ($\omega$4), and the fourth radius of rotation (r4) is less than the third radius of rotation (r3).

Since the fourth radius of rotation (r4) is less than the third radius of rotation (r3) as described above, the traveling direction of the robot cleaner 100 can be changed at higher speed as the LS position is located closer to the rear end of the floor to be cleaned.

Although not shown in the drawings, if the LS is located in the RRRR region, the robot cleaner 100 may move or travel along a different direction in the same manner as in the scheme of FIG. 23D.

Figure 23E:
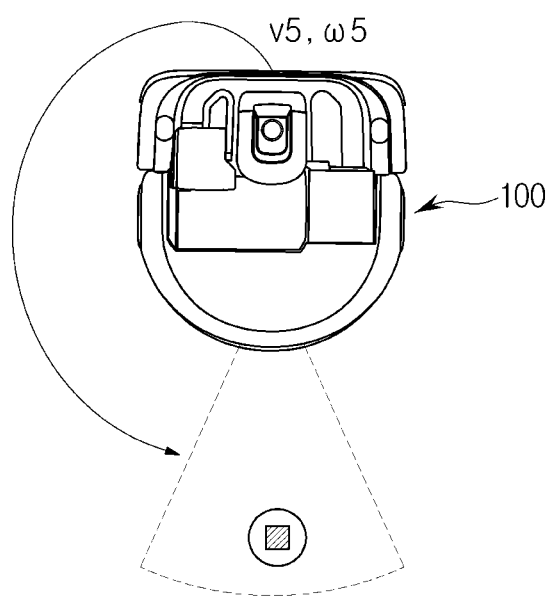

If the LS is located in the LERR region as shown in FIG. 23E, the robot cleaner 100 may move or travel at a fifth linear velocity (v5) and a fifth angular velocity ($\omega$5).

In this case, the fifth linear velocity (v5) may be identical to the fourth linear velocity (v4), and the fifth angular velocity ($\omega$5) may be identical to the fourth angular velocity ($\omega$4). In other words, the robot cleaner 100 may perform rotation traveling having a fifth radius of rotation (r5) corresponding to a fifth linear velocity (v5) and a fifth angular velocity ($\omega$5), and the fifth radius of rotation (r5) may be identical to the fourth radius of rotation (r4).

However, the scope or spirit of the present invention is not limited to the fact that the fifth linear velocity (v5) and the fifth angular velocity ($\omega$5) are respectively identical to the fourth linear velocity (v4) and the fourth angular velocity ($\omega$4), and it should be noted that the fifth linear velocity (v5) may be less than the fourth linear velocity (v4) and the fifth angular velocity ($\omega$5) may be higher than the fourth angular velocity ($\omega$4).

As described above, the robot cleaner 100 may have lower linear velocity and higher angular velocity as the LS position of the robot cleaner 100 is located closer to the rear end of the floor to be cleaned. As described above, since the linear velocity becomes lower and the angular velocity becomes higher as the LS position is located closer to the rear end of the floor, the robot cleaner 100 can more rapidly change traveling directions in inverse proportion to the distance between the LS position and the rear end of the floor to be cleaned, so that the robot cleaner 100 can rapidly arrive at the LS position.

Thereafter, the robot cleaner 100 may determine whether reception of the drag command is interrupted or stopped in operation 1040. That is, the robot cleaner 100 may determine whether the light reception unit 190 receives the infrared light including the drag command.

Reception of the drag command may be interrupted for various reasons.

For example, if the user stops the drag command, the robot cleaner 100 may not receive the infrared light having the drag command.

If the robot cleaner 100 arrives at the LS position, the user may stop the drag command. That is, the user may stop pressing the drag button 225 of the remote device 200.

If the robot cleaner 100 arrives at the designated position, reception of the drag command may be interrupted.

In another example, if the LS deviates from a specific range in which the robot cleaner 100 can receive the infrared light, the robot cleaner 100 may not receive the infrared light having the drag command.

If the position indicated by the remote device 200 quickly moves by the user, the LS may deviate from the RR range of the robot cleaner 100.

If the LS deviates from the RR region of the robot cleaner 100, the robot cleaner 100 is unable to receive the infrared light having the drag command, reception of the drag command is interrupted.

If the robot cleaner 100 arrives at the designated position, or if the user indicates another position located outside of the infrared reception range (RR) of the robot cleaner 100, the robot cleaner 100 may not receive the infrared light having the drag command.

If the drag command is continuously received in operation 1040, the robot cleaner 100 may repeatedly perform detection of the LS position and movement to the LS.

If reception of the drag command is interrupted in operation 1040, the robot cleaner 100 may stop tracing of the LS.

If the drag traveling 1000 is interrupted, the robot cleaner 100 may perform the previous operation of the drag traveling 1000 or may perform new operations.

If the obstacle (O) is detected on the movement path during the drag traveling, the robot cleaner 100 avoids collision with the obstacle (O), so that the robot cleaner 100 can move along a minimum path reaching the LS.

A collision avoidance traveling in which the robot cleaner 100 of the drag traveling mode avoids colliding with the obstacle (O) will hereinafter be described in detail.

Figure 24:
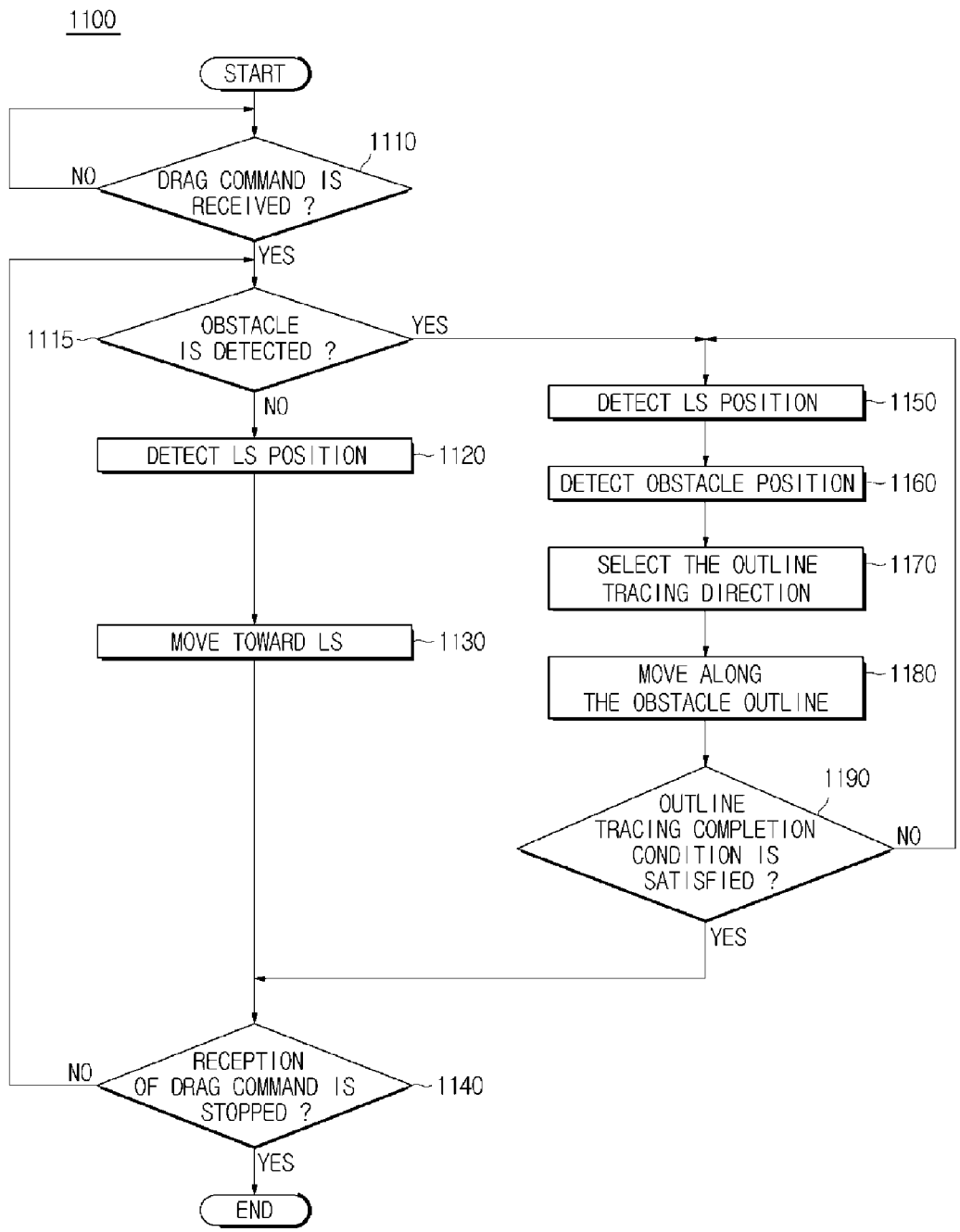
FIG. 24 is a flowchart illustrating a method for performing collision avoidance traveling of the robot cleaner according to an embodiment of the present disclosure.
Figure 25:
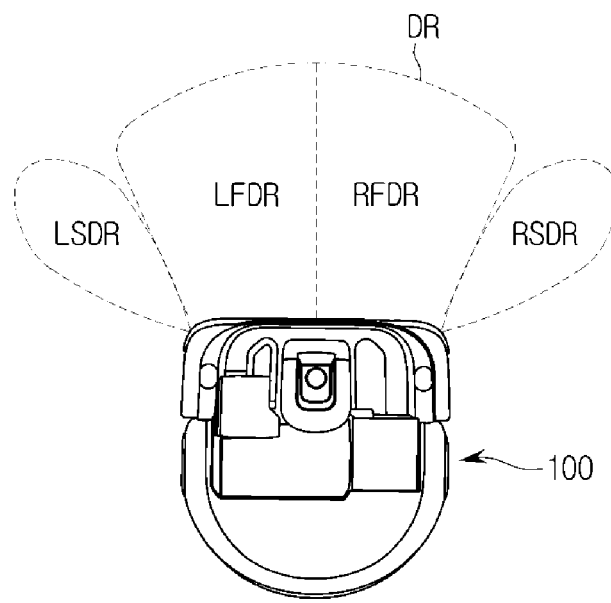
FIG. 25 is a conceptual diagram illustrating a method for allowing the robot cleaner to detect the position of an obstacle according to an embodiment of the present disclosure.
Figure 26A:
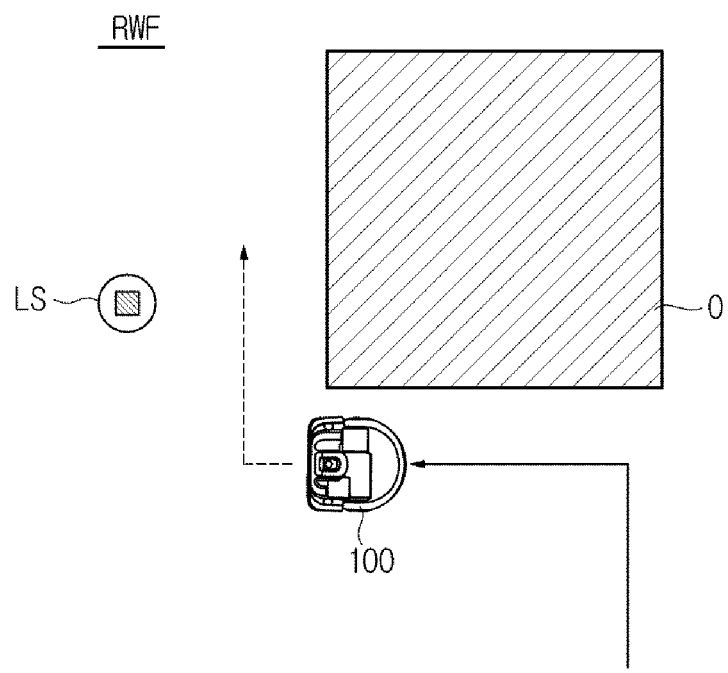
FIGS. 26A and 26B are conceptual diagrams illustrating a method for allowing the robot cleaner to trace the outline of an obstacle according to an embodiment of the present disclosure.
Figure 26B:
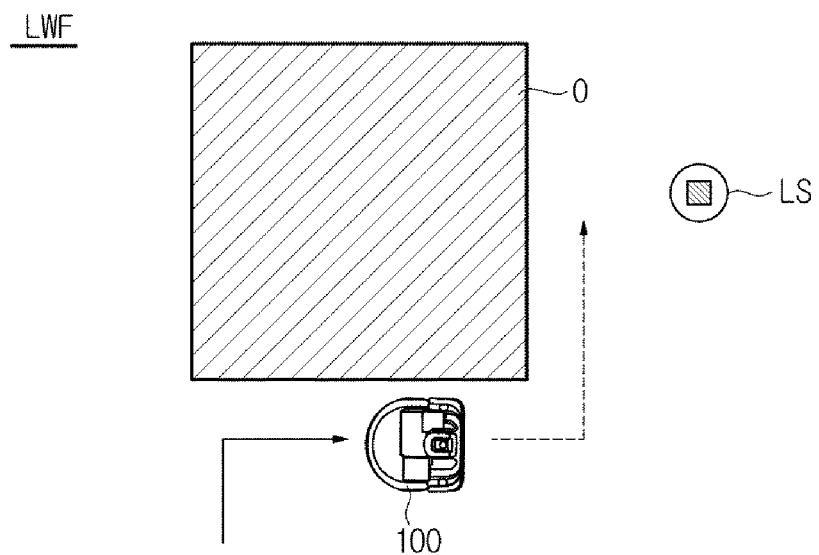

FIG. 24 is a flowchart illustrating a method for performing collision avoidance traveling of the robot cleaner according to an embodiment of the present disclosure. FIG. 25 is a conceptual diagram illustrating a method for allowing the robot cleaner to detect the position of an obstacle according to an embodiment of the present disclosure. FIGS. 26A and 26B are conceptual diagrams illustrating a method for allowing the robot cleaner to trace the outline of an obstacle according to an embodiment of the present disclosure.

The collision avoidance traveling 1100 of the robot cleaner 100 will hereinafter be described with reference to FIGS. 24 to 26. The same operations as in the above-mentioned description will be briefly described for convenience of description and better understanding of the present disclosure.

The robot cleaner 100 may determine whether the drag command is received from the remote device 200 in operation 1110.

If the user points a specific position (i.e., the floor to be cleaned) to which the robot cleaner 100 will move, and then inputs a drag command to the remote device 200, the remote device 200 modulates the infrared light according to the drag command, and emits the modulated infrared light along with the visible light to the position at which the robot cleaner 100 will arrive.

The robot cleaner 100 may receive the infrared light reflected from the floor to be cleaned, and demodulate the received infrared light, resulting in acquisition of the drag command.

If the drag command is not received in operation 1110, the robot cleaner 100 may continuously perform the previous operation.

If the drag command is received in operation 1010, the robot cleaner 100 may determine whether the obstacle (O) is detected in operation 1115.

The robot cleaner 100 may detect the obstacle (O) obstructing the traveling of the robot cleaner 100 using the obstacle sensing unit 140.

The robot cleaner 100 may detect the obstacle located forward of the robot cleaner 100 using the light emission module 141 and the light reception module 143.

The light emission module 141 may emit plane light to the front side of the robot cleaner 100, and the light reception module 143 may receive the reflection light reflected from the obstacle (O). As described above, the reflection light is reflected from several parts of the obstacle (O), so that the light reception module 143 may receive a two-dimensional reflected-light image. In addition, the robot cleaner 100 may calculate the position, size, etc. of the obstacle (O) on the basis of the reflected-light image received by the light reception module 143.

In addition, the robot cleaner 100 may detect the obstacle (O) located at the side of the robot cleaner 100 using the light sensor module 145.

The light sensor module 145 may emit light to the side of the robot cleaner 100, and may receive the light reflected from the obstacle (O). In addition, the robot cleaner 100 may analyze the received light, and may calculate the distance between the robot cleaner 100 and the obstacle (O).

If the obstacle (O) is not detected in operation 1115, the robot cleaner 100 may detect the LS position through the light reception unit 190 in operation 1120, and moves to the detected LS position in operation 1130.

The LS position detection and the LS movement are identical to those of the above-mentioned description.

In addition, the robot cleaner 100 may determine whether reception of the drag command is stopped in operation 1140.

If the robot cleaner 100 arrives at the designated position, or if the user indicates a specific position located outside of the infrared reception range of the robot cleaner 100, reception of the drag command may be stopped.

If the drag command is continuously received in operation 1040, the robot cleaner 100 may detect the obstacle, detect the LS position, and move to the LS, so that the obstacle detection operation, the LS detection operation, and the LS movement operation are repeatedly performed.

If reception of the drag command is stopped in operation 1040, the robot cleaner 100 may stop tracing of the LS.

If the obstacle (O) is detected in operation 1115, the robot cleaner 100 may detect the LS position in operation 1150.

As described above, the robot cleaner 100 may determine the LS position on the basis of the position of the IR receiver, that has received the infrared light from the remote device 200, from among the plurality of IR receivers (191a~191f) contained in the light reception unit 190.

In more detail, the robot cleaner 100 may divide the infrared reception region (RR) in which the robot cleaner 100 can receive the infrared light into a plurality of infrared reception regions (FORR, RFRR, RSRR, RRRR, RERR, LRRR, LSRR, LFRR), and may determine the LS region on the basis of the position of the IR receiver configured to receive the infrared light.

Thereafter, the robot cleaner 100 may detect the position of the obstacle (O) in operation 1160.

The robot cleaner 100 may detect the obstacle (O) position using the obstacle sensing unit 140.

For example, as shown in FIG. 25, the robot cleaner 100 may divide the obstacle detection region (DR) in which the obstacle sensing unit 140 can detect the obstacle (O) into a plurality of regions, and may determine which region has the obstacle (O).

The obstacle detection region (DR) may be divided into a left detection region (LSDR) located at the left side of the robot cleaner 100, a left-front detection region (LFDR) located at a left-front side of the robot cleaner 100, a right-front detection region (RFDR) located at a right-front side of the robot cleaner 100, and a right detection region (RSDR) located at the right side of the robot cleaner 100.

If the obstacle (O) is detected by the left light sensor module 145a contained in the obstacle sensing unit 140, the robot cleaner 100 may determine that the obstacle (O) is located in the left detection region (LSDR). If the obstacle (O) is detected by the right light sensor module 145b, the robot cleaner 100 may determine that the obstacle (O) is located in the right detection region (RSDR). In addition, the robot cleaner 100 may determine whether the obstacle (O) is located in the LFDR region or the RFDR region on the basis of the reflected-light image received by the light reception module 143.

Although the above-mentioned embodiment has exemplarily disclosed that the obstacle detection region (DR) is divided into four detection region, the scope or spirit of the present disclosure is not limited thereto. For example, the obstacle detection region (DR) may be divided into 3 or less detection regions or 5 or higher detection regions.

In addition, the above-mentioned embodiment has exemplarily disclosed a method for controlling the robot cleaner 100 to detect the obstacle (O) position, and the robot cleaner 100 may also detect the obstacle (O) position in various ways.

After the light spot (LS) position and the obstacle (O) position are detected, the robot cleaner 100 may select the direction of the outline trace traveling that avoids collision with the obstacle (O) in operation 1170.

If the obstacle (O) is detected, the robot cleaner 100 performs the outline tracing movement during which the robot cleaner 100 moves in parallel to the outline of the obstacle (O) such that the robot cleaner 100 avoids colliding with the obstacle (O) and moves toward the light spot (LS).

As can be seen from FIGS. 26A and 26B, the outline tracing traveling may include a right tracing traveling (RWF) and a left tracing traveling (LWF). During the right tracing traveling (RWF), the robot cleaner 100 travels simultaneously while maintaining a predetermined distance the right part of the robot cleaner 100 and the obstacle (O). During the left tracing traveling (LWF), the robot cleaner 100 travels simultaneously while maintaining a predetermined distance between the left part of the robot cleaner 100 and the obstacle (O).

If the obstacle (O) is detected during the drag traveling, the robot cleaner 100 may select any one of the right tracing traveling (RWF) and the left tracing traveling (LWF) on the basis of the light spot (LS) position and the obstacle (O) position, so that the robot cleaner can travel to the LS position along a minimum path.

As described above, the trace traveling selection method in which the robot cleaner 100 selects any one of the right tracing traveling (RWF) and the left tracing traveling (LWF) will hereinafter be described in detail.

If the direction for tracing the obstacle (O) outline is detected, the robot cleaner 100 may travel in parallel to the outline of the obstacle (O) according to the selected direction in operation 1180.

The controller 110 of the robot cleaner 100 may control the traveling unit 160 in such a manner that the left or right side of the robot cleaner 100 can travel simultaneously while maintaining a predetermined distance with the outline of the obstacle (O).

Thereafter, the robot cleaner 100 may determine whether or not the outline tracing completion condition of the obstacle (O) is satisfied in operation 1190.

If the LS position is located opposite to the obstacle (O), or if the LS position is located in an opposite direction of the traveling direction of the robot cleaner 100, the robot cleaner 100 may stop the outline trace traveling and may perform the drag traveling for tracing the light spot (LS).

A specific condition in which the robot cleaner 100 stops the outline tracing traveling and starts the drag traveling will hereinafter be described in detail.

If the outline tracing completion condition is not satisfied in operation 1190, the robot cleaner 100 may detect the LS position, detect the obstacle (O), and perform the outline tracing of the obstacle (O), so that the LS detection, the obstacle (O) detection, and the obstacle (O) outline tracing are repeatedly performed.

If the outline tracing completion condition is satisfied in operation 1190, the robot cleaner 100 may determine whether the drag command reception is stopped in operation 1140.

If the drag command is continuously received in operation 1040, the robot cleaner 100 may repeatedly perform the obstacle (O) detection, the LS position detection, and the movement to the LS. If reception of the drag command is stopped in operation 1040, the robot cleaner 100 may stop tracing of the LS and may also stop tracing of the obstacle (O) outline.

As described above, the trace traveling selection method in which the robot cleaner 100 selects any one of the right tracing traveling (RWF) and the left tracing traveling (LWF) will hereinafter be described in detail.

FIGS. 27A to 32B exemplarily illustrate that the robot cleaner selects an outline tracing direction according to an embodiment of the present disclosure.

As described above, the robot cleaner 100 may select the obstacle (O) tracing direction according to the LS position and the obstacle (O) position.

Figure 27A:
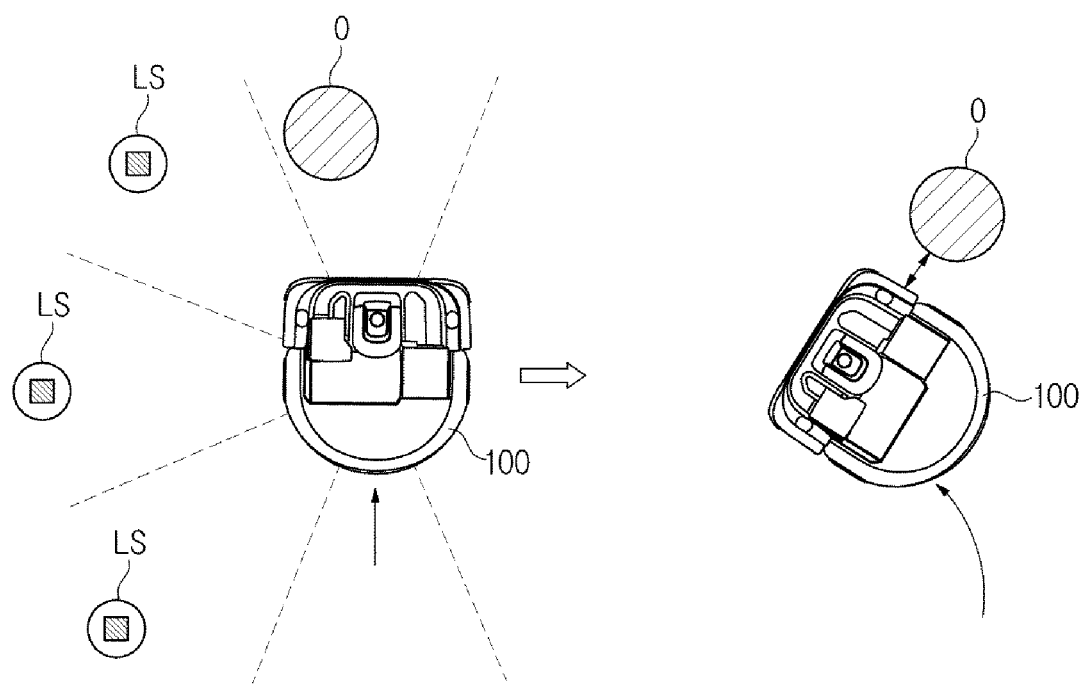
FIGS. 27A to 32B exemplarily illustrate that the robot cleaner selects an outline tracing direction according to an embodiment of the present disclosure.
Figure 27B:
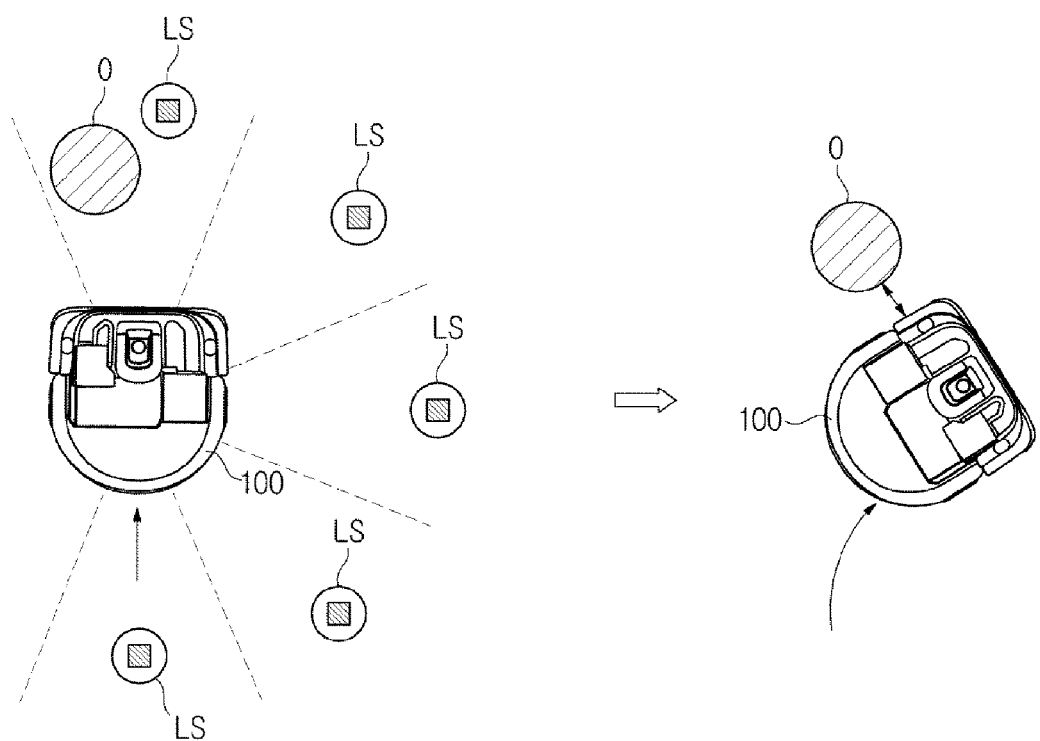

For example, if the obstacle (O) is detected in the LFDR region, the robot cleaner 100 may select any one of the right tracing traveling (RWF) and the left tracing traveling (LWF) according to the LS position as shown in FIGS. 27A and 27B. During the right tracing traveling (RWF), the robot cleaner 100 travels while maintaining a predetermined distance between the right part of the robot cleaner 100 and the obstacle (O). During the left tracing traveling (LWF), the robot cleaner 100 travels simultaneously while maintaining a predetermined distance between the left part of the robot cleaner 100 and the obstacle (O).

In more detail, as can be seen from FIG. 27A, if the obstacle (O) is detected in the LFDR region, and if the LS is detected in any one of the LFRR region, the LSRR region, and the LRRR region, the robot cleaner 100 may turn to the left and then perform the right tracing traveling (RWF).

In addition, as can be seen from FIG. 27B, if the obstacle (O) is detected in the LFDR region, and if the LS is detected in any one of the FORR region, the RFRR region, the RSRR region, the RRRR region, and the RERR region, the robot cleaner 100 turns right and performs the left tracing traveling (LWF).

If the obstacle (O) is located in the LFDR region, the robot cleaner 100 may select any one of the right tracing traveling (RWF) and the left tracing traveling (LWF) according to the relative position of the light spot (LS) on the basis of the obstacle (O) position.

In more detail, if the LS is located at the left side of the obstacle (O), the robot cleaner 100 turns left toward the LS and then performs the right tracing traveling (RWF). If the LS is located at the right side of the obstacle (O), the robot cleaner 100 turns right toward the LS and then performs the left tracing traveling (LWF).

Although not shown in the drawings, even when the obstacle (O) is detected in the LFDR region and the LSDR region, the robot cleaner 100 may perform the outline tracing traveling according to the same principle as in the above-mentioned description.

Figure 28A:
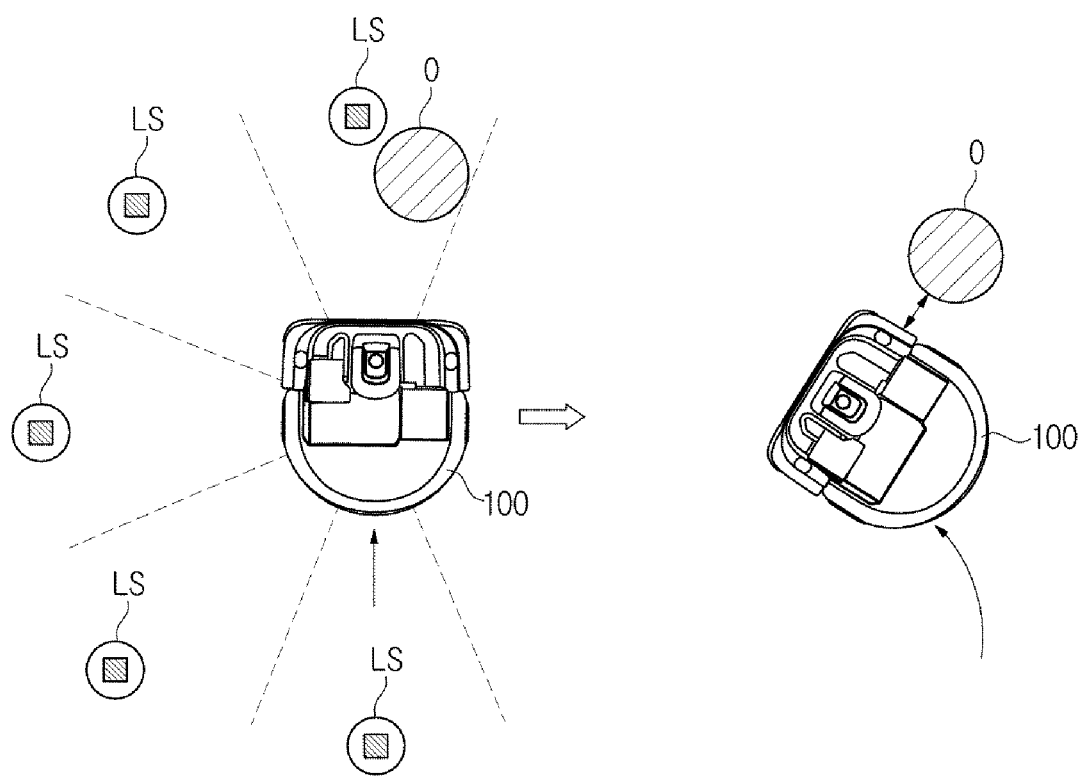
Figure 28B:
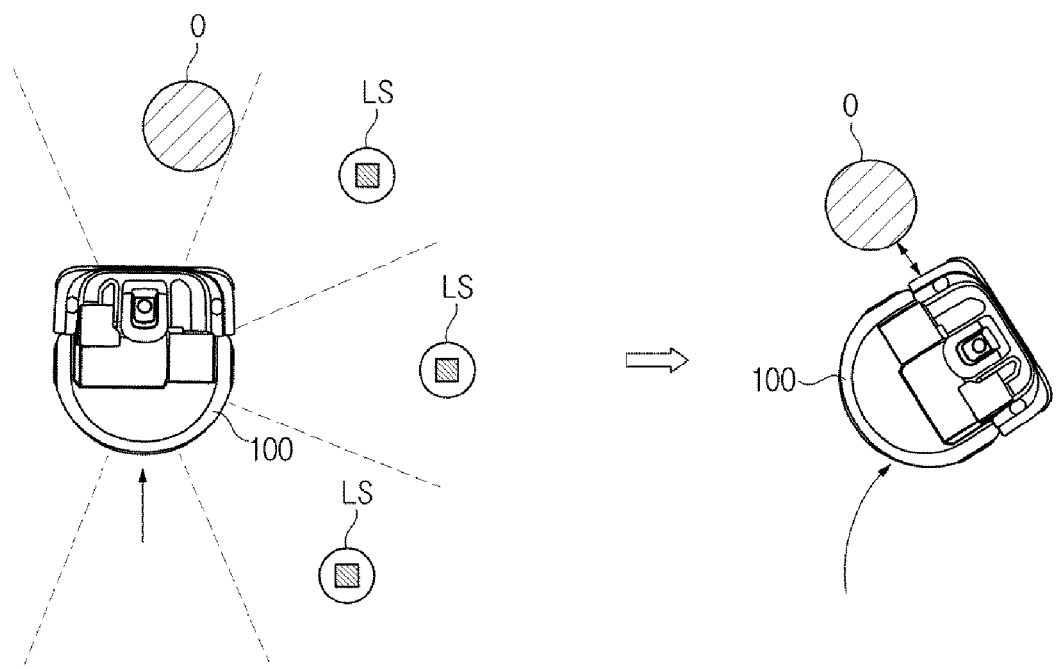

If the obstacle (O) is detected in the RFDR region, the robot cleaner 100 may select any one of the right tracing traveling (RWF) and the left tracing traveling (LWF) according to the LS position as shown in FIGS. 28A and 28B.

In more detail, as can be seen from FIG. 28A, if the obstacle (O) is detected in the RFDR region, and if the LS is detected in any one of the FORR region, the LFRR region, the LSRR region, the LRRR region, and the RERR region, the robot cleaner 100 turns left and performs the right tracing traveling (RWF).

In addition, as can be seen from FIG. 28B, if the obstacle (O) is detected in the RFDR region, and if the LS is detected in any one of the RFRR region, the RSRR region, and the RRRR region, the robot cleaner 100 turns right and performs the left tracing traveling (LWF).

If the obstacle (O) is located in the LFDR and RFDR regions, the robot cleaner 100 may select any one of the right tracing traveling (RWF) and the left tracing traveling (LWF) according to the relative position of the light spot (LS) on the basis of the obstacle (O) position.

In more detail, if the LS is located at the left side of the obstacle (O), the robot cleaner 100 turns left toward the LS and then performs the right tracing traveling (RWF). If the LS is located at the right side of the obstacle (O), the robot cleaner 100 turns right toward the LS and then performs the left tracing traveling (LWF).

Although not shown in the drawings, even when the obstacle (O) is detected in the RFDR region and the RSDR region, the robot cleaner 100 may perform the outline tracing traveling according to the same principle as in the above-mentioned description.

Figure 29A:
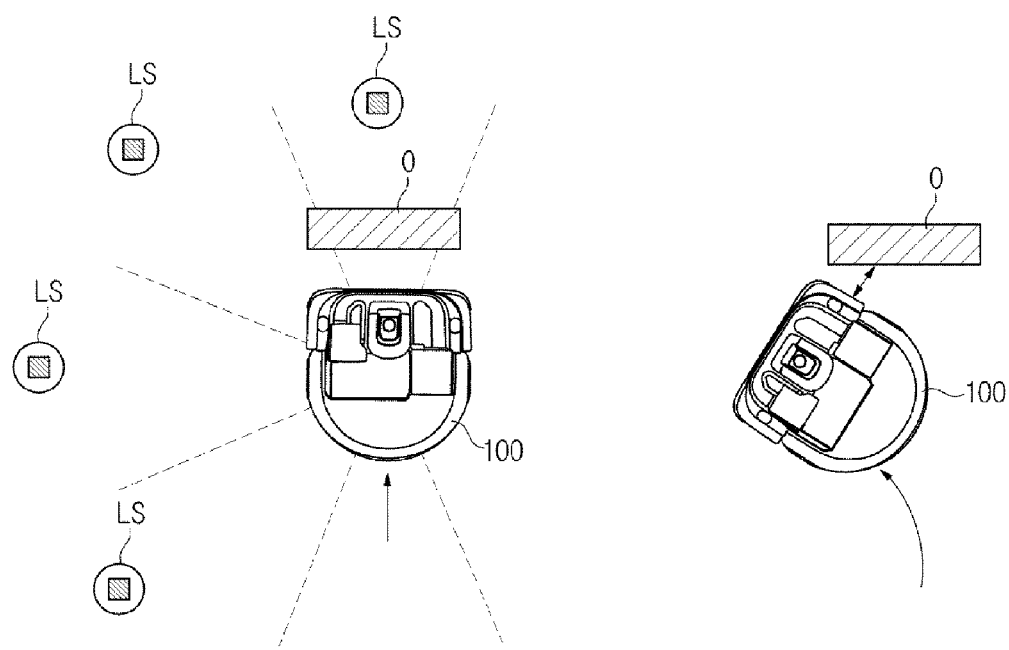
Figure 29B:
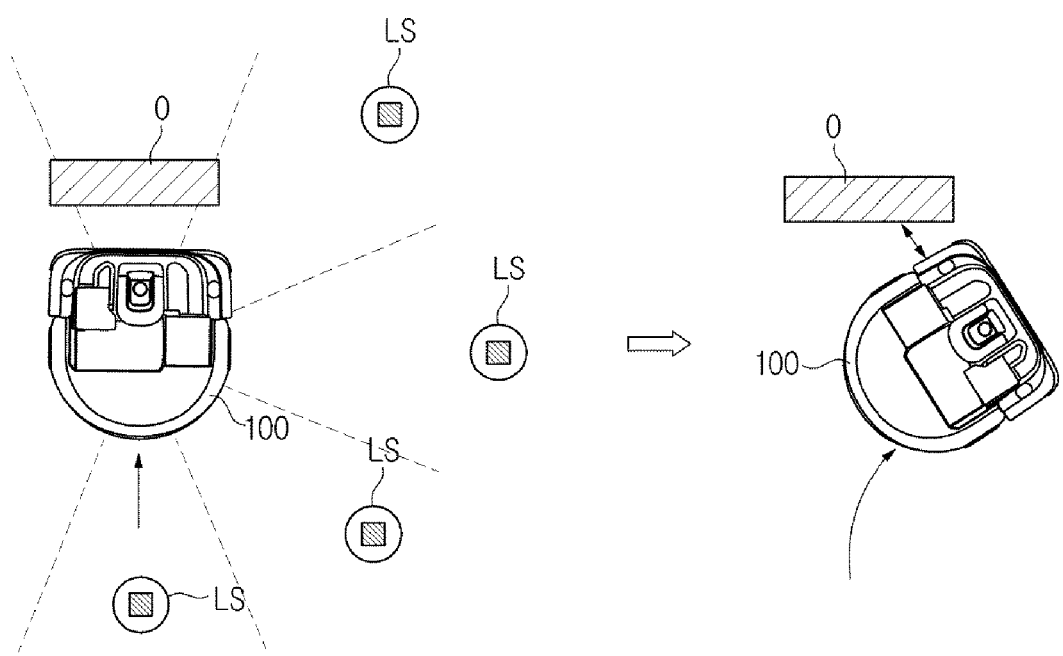

If the obstacle (O) is detected in the LFDR and RFDR regions, the robot cleaner 100 may trace the outline of the obstacle (O) according to the LS position as shown in FIGS. 29A and 29B.

In more detail, as shown in FIG. 29A, if the obstacle (O) is detected in the LFDR and RFDR regions, and if the LS is detected in any one of the LFRR region, the LSRR region, and the LRRR region, the robot cleaner 100 turns left and performs the right tracing traveling (RWF).

If the obstacle (O) is detected in the LFDR and RFDR regions, and if the LS is located in the FORR region, the robot cleaner 100 may turn left and then perform the right tracing traveling (RWF) as shown in FIG. 29A. However, the scope or spirit of the present disclosure is not limited thereto, the robot cleaner 100 may turn right and then perform the left tracing traveling (LWF).

In addition, as can be seen from FIG. 29B, if the obstacle (O) is detected in the LFDR and RFDR regions, and if the LS is detected in any one of the RFRR region, the RSRR region, and the RRRR region, the robot cleaner 100 turns right and performs the left tracing traveling (LWF).

In another example, if the obstacle (O) is detected in the LFDR and RFDR regions, and if the LS is located in the RERR region, the robot cleaner 100 may turn right and then perform the left tracing traveling (LWF) as shown in FIG. 29B. However, the scope or spirit of the present invention is not limited thereto, and the robot cleaner 100 may turn left and then perform the right tracing traveling (RWF) according to configuration information.

If the obstacle (O) is located in the LFDR and RFDR regions, the robot cleaner 100 may select any one of the right tracing traveling (RWF) and the left tracing traveling (LWF) according to the LS position.

In more detail, if the obstacle (O) is detected in the LFDR and RFDR regions, and if the LS is detected in any one of the right tracing traveling (RWF) and the left tracing traveling (LWF) according to the LS position.

In more detail, if the LS is located at the left side, the robot cleaner 100 turns left toward the light spot (LS), and then performs the right tracing traveling (RWF). If the LS is located at the right side, the robot cleaner 100 turns right toward the LS and then performs the left tracing traveling (LWF).

In summary, if the obstacle is located on the traveling direction of the robot cleaner 100, the robot cleaner 100 may select any one of the right tracing traveling (RWF) and the left tracing traveling (LWF) according to the relative position of the LS on the basis of the obstacle (O) position.

Figure 30A:
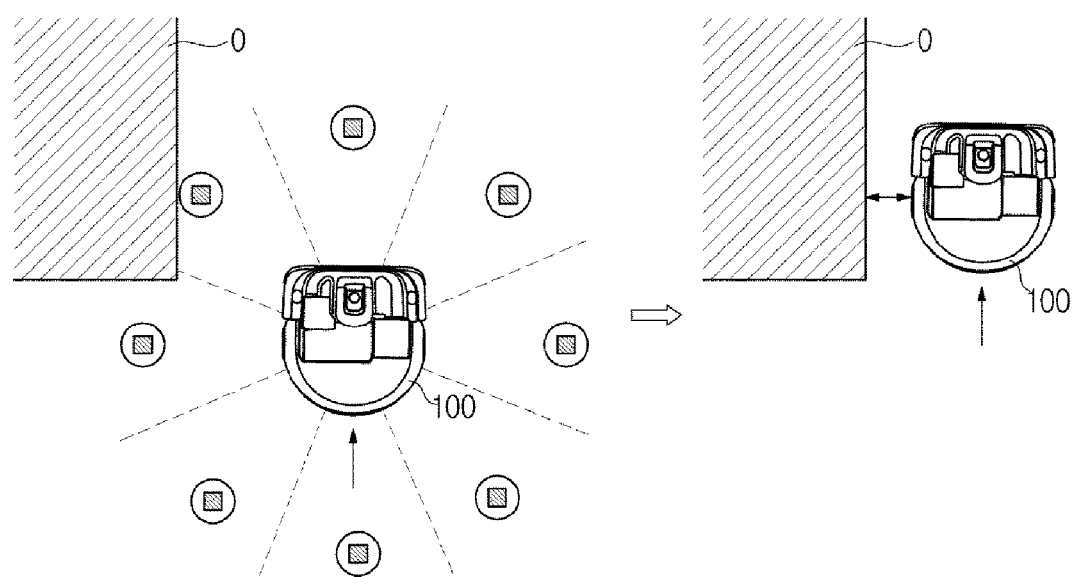
Figure 30B:
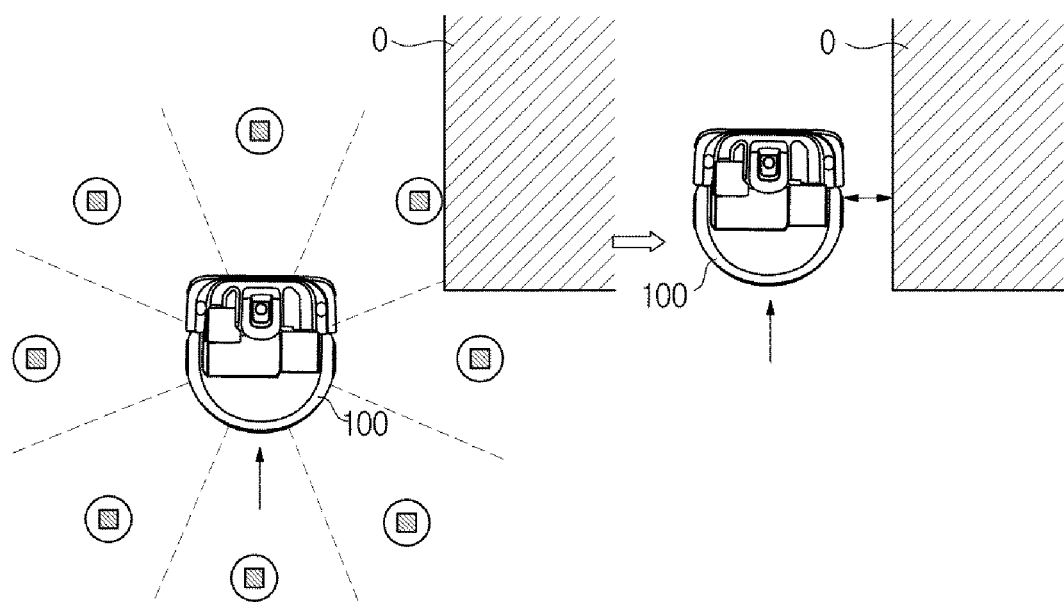

In another example, if the obstacle (O) is detected in the left detection region (LSDR) or the right detection region (LRDR), the robot cleaner 100 may select any one of the right tracing traveling (RWF) and the left tracing traveling (LWF) as shown in FIGS. 30A and 30B.

In more detail, as shown in FIG. 30A, if the obstacle (O) is detected in the left detection region (LSDR), the robot cleaner 100 may perform the left tracing traveling (LWF). The scope or spirit of the present disclosure is not limited thereto. If the obstacle (O) is detected in the LSDR region and the LS is detected in the LSRR region or the LRRR region, the robot cleaner 100 turns left and performs the right tracing traveling (RWF).

In addition, if the obstacle (O) is detected in the right detection region (RSDR) as shown in FIG. 30B, the robot cleaner 100 may perform the right tracing traveling (RWF). However, the scope or spirit of the present disclosure is not limited thereto. If the obstacle (O) is detected in the RSDR region and the LS is detected in the RSRR or RRRR region, the robot cleaner 100 turns right and then performs the left tracing traveling (RWF).

In another example, if the obstacle (O) is detected in the left detection regions (LFDR, RFDR) and the left detection region (LSDR) or if the obstacle (O) is detected in the front detection regions (LFDR, RFDR) and the right detection region (LRDR), the robot cleaner 100 may select any one of the right tracing traveling (RWF) and the left tracing traveling (LWF) according to the obstacle (O) position.

Figure 31A:
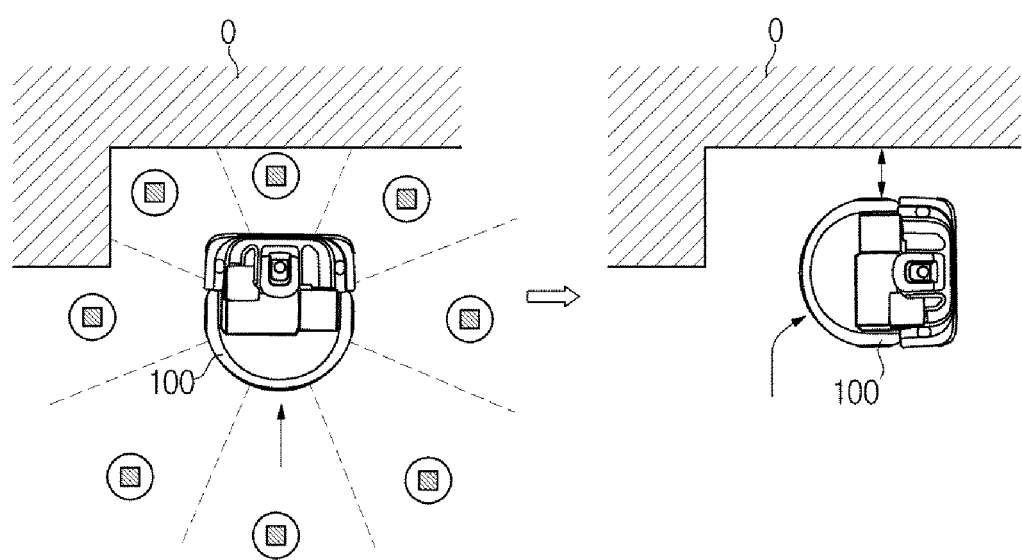

In more detail, if the obstacle (O) is detected in the front detection regions (LFDR, RFDR) and the LSDR region as shown in FIG. 31A, the robot cleaner 100 turns right and then performs the left tracing traveling (LWF). However, the scope or spirit of the present disclosure is not limited thereto. If the obstacle (O) is detected in the front detection regions (LFDR, RFDR) and the left detection region (LSDR), and if the LS is detected in the LSRR region or the LRRR region, the robot cleaner 100 turns left and then performs the right tracing traveling (RWF).

Although not shown in the drawings, even when the obstacle (O) is detected in the RFDR region and the LSDR region, the robot cleaner 100 turns right and then performs the left tracing traveling (LWF).

Figure 31B:
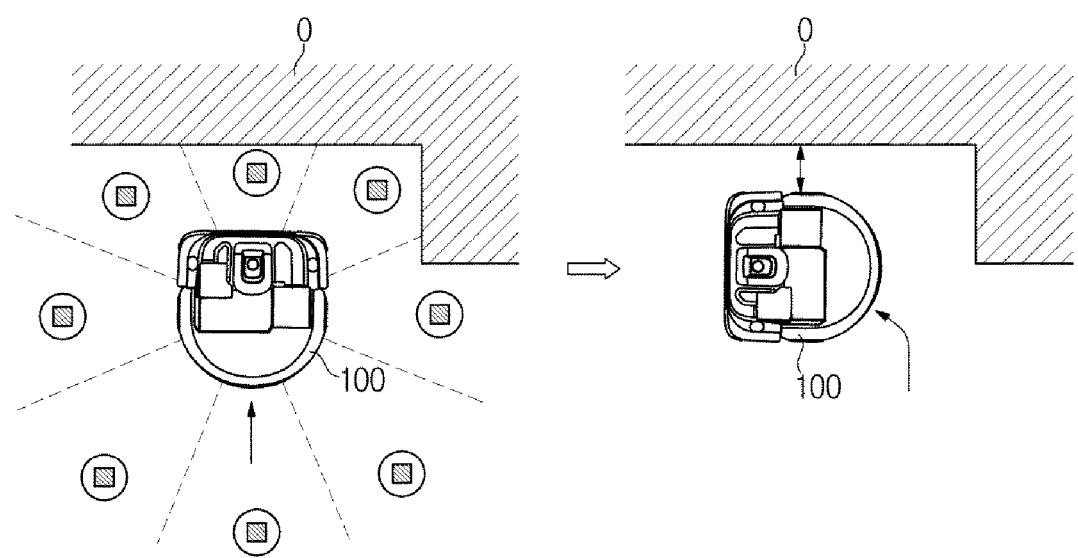

In more detail, if the obstacle (O) is detected in the front detection regions (LFDR, RFDR) and the RSDR region as shown in FIG. 31B, the robot cleaner 100 turns left and then performs the right tracing traveling (RWF). However, the scope or spirit of the present disclosure is not limited thereto. If the obstacle (O) is detected in the front detection regions (LFDR, RFDR) and the right detection region (RSDR), and if the LS is detected in the LSRR region or the LRRR region, the robot cleaner 100 turns right and then performs the left tracing traveling (LWF).

Although not shown in the drawings, even when the obstacle (O) is detected in the LFDR region and the RSDR region, the robot cleaner 100 turns left and then performs the right tracing traveling (RWF).

In summary, if the obstacle is detected at the side of the robot cleaner 100, the robot cleaner 100 may perform the outline tracing traveling in such a manner that a predetermined reference distance between the obstacle (O) and the detected lateral surface of the obstacle (O) can be maintained.

In another example, if the obstacle (O) is detected in the front detection regions (LFDR, RFDR) or the lateral detection regions (LSDR, LRDR), the robot cleaner 100 may select any one of the right tracing traveling (RWF) and the left tracing traveling (LWF) according to the LS position.

Figure 32A:
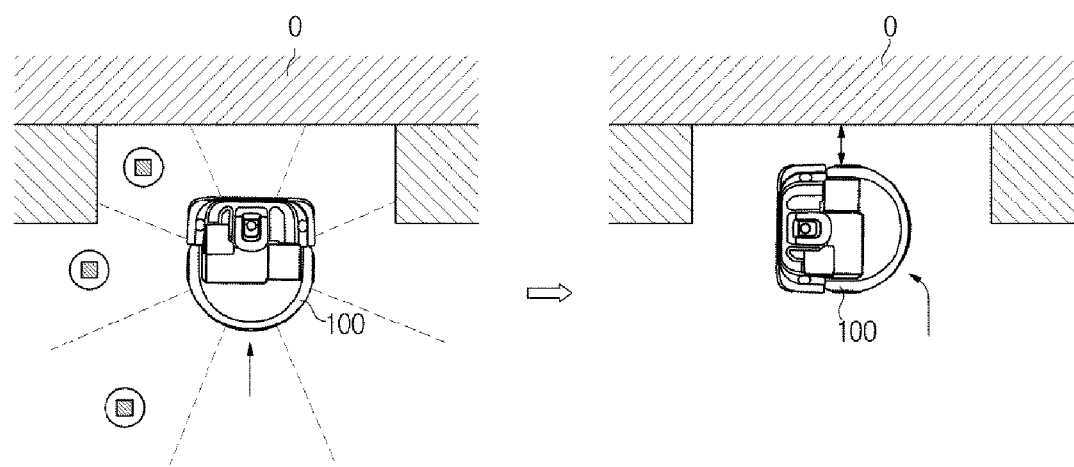

In more detail, as shown in FIG. 32A, if the obstacle (O) is detected in the LFDR and RFDR regions and the LSDR and LRDR regions, and if the LS is detected in the LFRR region or the LSRR or LRRR region, the robot cleaner 100 turns left and performs the right tracing traveling (RWF).

Although not shown in the drawings, if the obstacle (O) is detected in the LFDR and RFDR regions and the LSDR and LRDR regions, and if the LS is detected in the RFRR region or the RSRR or RRRR region, the robot cleaner 100 turns right and performs the left tracing traveling (LWF).

In addition, although not shown in the drawings, if the obstacle (O) is detected in the LFDR and RFDR regions and the LSDR and LRDR regions, and if the LS is detected in the FORR region or the RERR region, the robot cleaner 100 may select any one of the left tracing traveling (LWF) and the right tracing traveling (RWF).

The above-mentioned embodiments are merely example. If the obstacle (O) is detected in the LFDR and RFDR regions and the LSDR and LRDR regions, the robot cleaner 100 may select any one of the right tracing traveling (RWF) and the left tracing traveling (LWF) irrespective of the LS position.

In another example, if the obstacle (O) is detected in the LSDR and LRDR regions, the robot cleaner 100 may select any one of the right tracing traveling (RWF) and the left tracing traveling (LWF) according to the LS position.

Figure 32B:
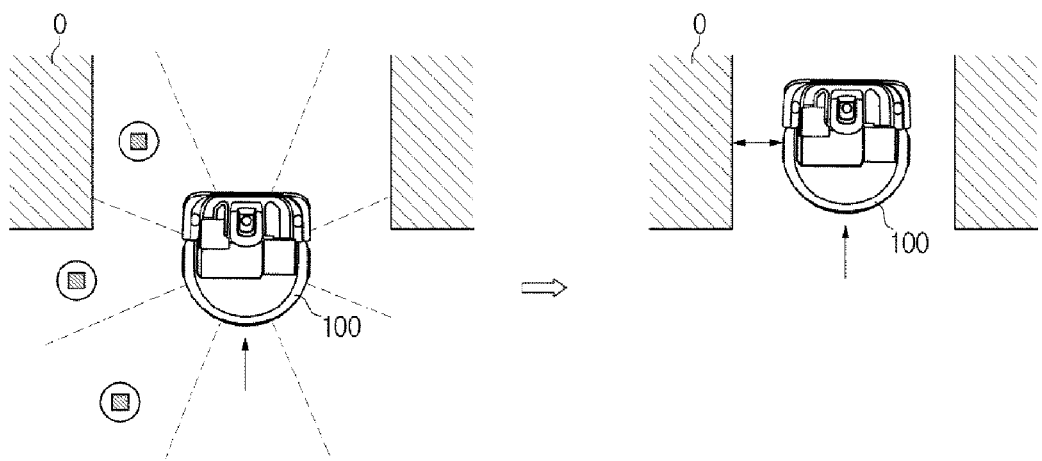

In more detail, as shown in FIG. 32B, if the obstacle (O) is detected in the LSDR and LRDR regions, and if the LS is detected in the LFRR region or the LSRR or LRRR regions, the robot cleaner 100 may perform the left tracing traveling (RWF).

Although not shown in the drawings, if the obstacle (O) is detected in the LSDR and LRDR regions, and if the LS is detected in the RFRR region or the RSRR or RRRR region, the robot cleaner 100 may perform the right tracing traveling (RWF).

In addition, although not shown in the drawings, if the obstacle (O) is detected in the LSDR and LRDR regions, and if the LS is detected in the FORR region or the RERR region, the robot cleaner 100 may select any one of the left tracing traveling (LWF) and the right tracing traveling (RWF).

The above-mentioned embodiments are merely example. If the obstacle (O) is detected in the LSDR and LRDR regions, the robot cleaner 100 may select any one of the right tracing traveling (RWF) and the left tracing traveling (LWF) irrespective of the LS position.

The robot cleaner 100 may select the tracing direction for the outline tracing traveling when the initial obstacle (O) is detected, and may perform the selected outline tracing traveling before escaping from the outline tracing traveling. In addition, the robot cleaner 100 may also select the outline tracing direction at intervals of a predetermined time when the obstacle (O) is detected during traveling.

A method for controlling the robot cleaner 100 to deviate from the outline tracing traveling when the robot cleaner 100 is in the outline tracing traveling mode will hereinafter be described in detail.

FIGS. 33A to 34B exemplarily illustrate that the robot cleaner deviates from the outline tracing travel according to an embodiment of the present disclosure.

Figure 33A:
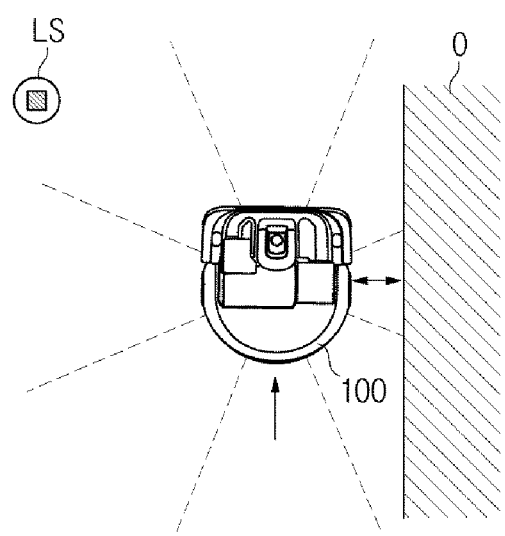
FIGS. 33A to 34B exemplarily illustrate that the robot cleaner deviates from the outline tracing travel according to an embodiment of the present disclosure.
Figure 33B:
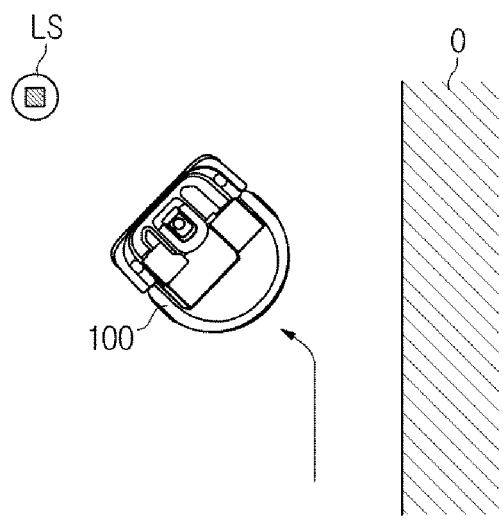

As shown in FIG. 33A, during the outline tracing traveling, if the LS is located opposite to the obstacle (O) or is located in an opposite direction of the traveling direction of the robot cleaner 100, the robot cleaner 100 may stop the outline tracing traveling as shown in FIG. 33B and may perform the drag traveling that traces the LS.

Figure 34A:
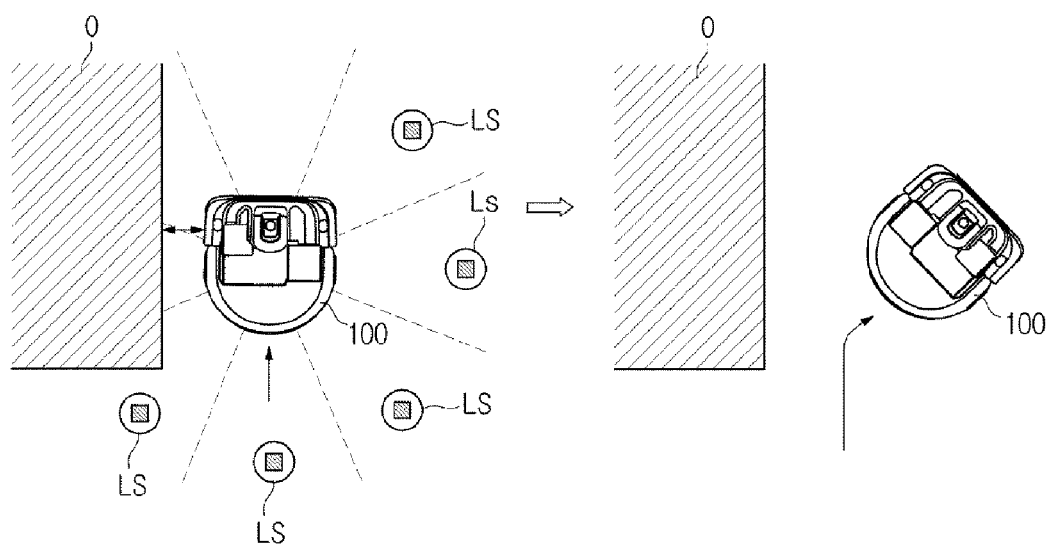

For example, during the left tracing traveling (LWF) as shown in FIG. 34A, if the LS is located in the right-front reception region (RFRR), the right reception region (RSRR), the right-rear reception region (RRRR), the rear reception region (RERR), or the left-rear reception region (LERR), the robot cleaner 100 may deviate from the outline tracing traveling and may rotate in a direction distant from the obstacle (O).

Figure 34B:
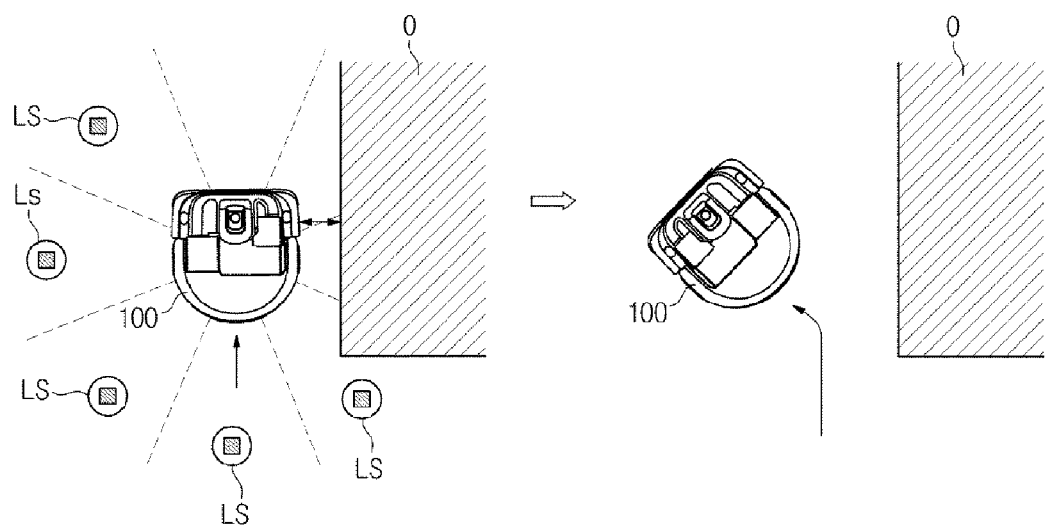

In addition, during the right tracing traveling (RWF) as shown in FIG. 34B, if the LS is detected in the left-front reception region (LFRR), the left reception region (LSRR), the left-rear reception region (LRRR), the rear reception region (RERR) or the right-rear reception region (RRRR), the robot cleaner 100 may deviate from the outline tracing traveling, and may rotate in a direction distant from the obstacle (O).

As described above, if the LS is located opposite to the obstacle (O) or if the LS is located in an opposite direction of the traveling direction of the robot cleaner 100, the robot cleaner 100 may stop the outline tracing traveling and may then perform the drag traveling that traces the LS.

One embodiment in which the robot cleaner 100 performs the drag traveling will hereinafter be described in detail.

FIGS. 35A to 35E exemplarily illustrates a method for performing drag traveling of the robot cleaner according to an embodiment of the present disclosure.

Figure 35A:
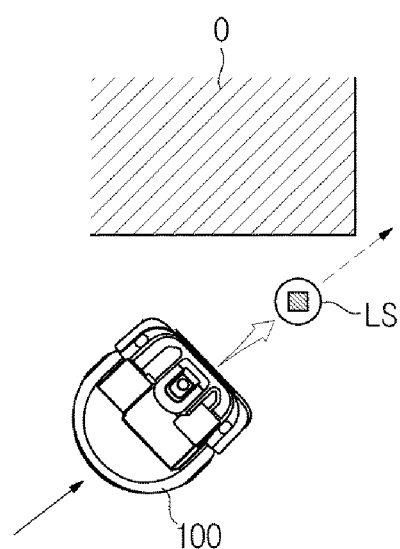
FIGS. 35A to 35E exemplarily illustrates a method for performing drag traveling of the robot cleaner according to an embodiment of the present disclosure.

If the drag command is received from the remote device 200, the robot cleaner 100 may perform the drag traveling tracing the light spot (LS) as shown in FIG. 35A.

If the obstacle (O) is detected during the drag traveling, the robot cleaner 100 may select the direction along which the robot cleaner traces the outline of the obstacle (O) according to the LS position and the obstacle (O) position.

Figure 35B:
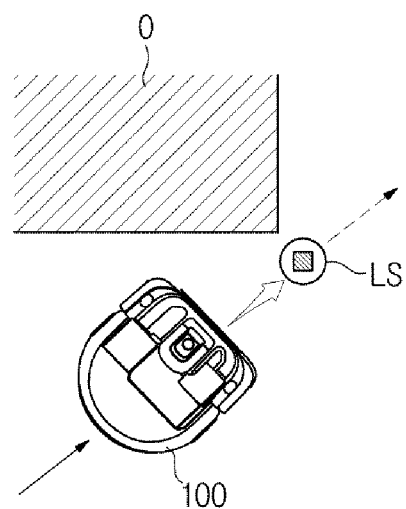
Figure 35C:
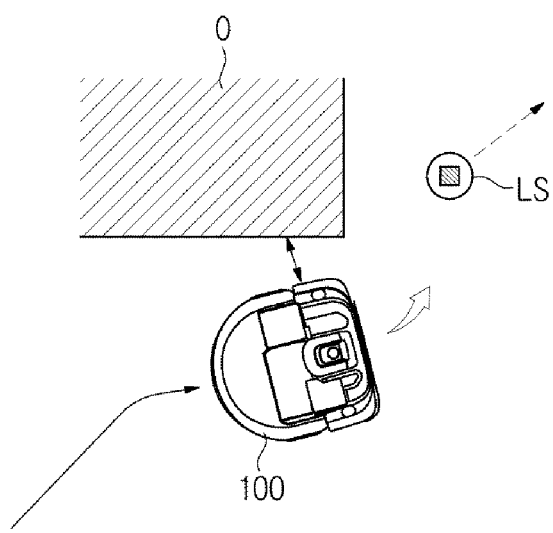

In more detail, if the obstacle (O) is detected in the left detection region (LSDR) and the left-front detection region (LFDR) as shown in FIG. 35B, and if the LS is the FORR region, the robot cleaner 100 may perform the left tracing traveling (LWF) during which a predetermined distance between the left side of the robot cleaner 100 and the obstacle (O) is maintained, as shown in FIG. 35C.

During the outline tracing traveling, the robot cleaner 100 may continuously perform the outline tracing traveling according to the LS position, or may deviated from the outline tracing traveling.

For example, if the LS is located in the same direction as in the obstacle (O) during the outline tracing traveling as shown in FIG. 35C, the robot cleaner 100 may continuously perform the outline tracing traveling.

Figure 35D:
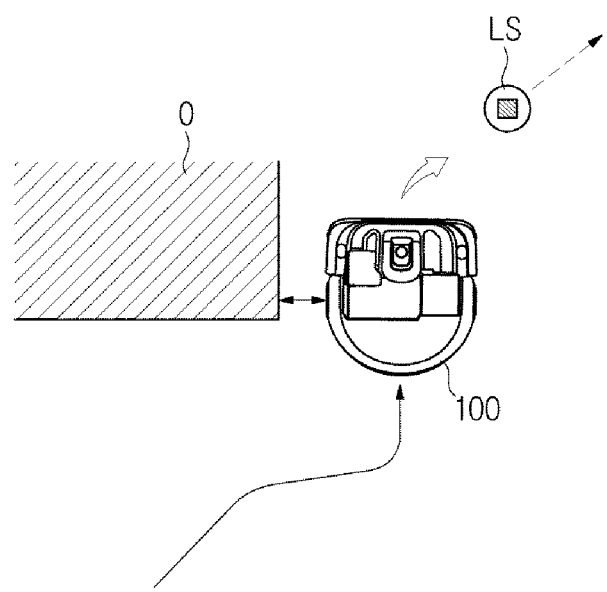

On the other hand, as shown in FIG. 35D, if the LS is located opposite to the obstacle (O), the robot cleaner 100 may stop the outline tracing traveling and may continuously perform the drag traveling that traces the LS.

Figure 35E:
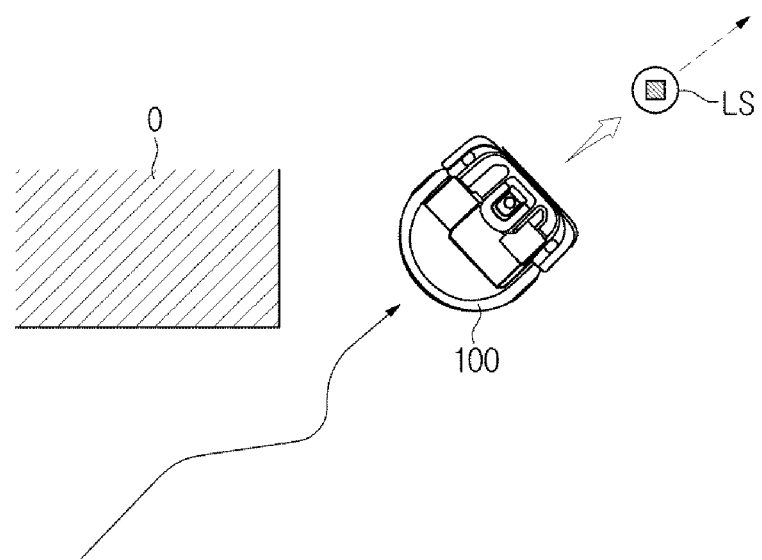

In accordance with the above-mentioned traveling result of the robot cleaner 100, the robot cleaner 100 may travel on the same traveling direction as in FIG. 35E.

During a time section in which the obstacle (O) is not detected, the robot cleaner 100 traces the LS and moves along the same path as the movement path of the LS. During a time section in which the obstacle (O) is detected, the robot cleaner 100 may trace the outline of the obstacle (O) and may move along the movement path similar to the outline of the obstacle (O).

As is apparent from the above description, if the robot cleaner 100 receives the drag command, the robot cleaner 100 can trace the LS generated by the remote device 200. If the obstacle (O) is detected during the LS tracing, the robot cleaner 100 may travel along the outline of the obstacle (O).

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A robot cleaner comprising:
   a main body;
   a wheel-driving motor and a traveling wheel to move the main body;
   an obstacle sensor to sense an obstacle;
   a light receptor to receive a position of a light spot of modulated light formed according to a control command of a user; and
   a controller configured to control the wheel-driving motor and traveling wheel to have the main body trace the light spot,
   wherein, when the obstacle is sensed, the controller further is configured to control the wheel-driving motor and traveling wheel such that the main body traces an outline of the obstacle according to the position of the light spot and a position of the obstacle to travel to the light spot position along a minimum path,
   wherein the controller performs any one of a right tracing traveling in which a right side of the main body travels toward the obstacle and a left tracing traveling in which a left side of the main body travels toward the obstacle according to the minimum path to the light spot position, and
   when the obstacle is located on a traveling direction of the main body, the controller is configured to control the wheel-driving motor and traveling wheel so that the main body rotates toward the light spot and traces the obstacle outline.

2. The robot cleaner according to claim 1, wherein:
   when the obstacle is located on the traveling direction of the main body and the light spot is located at a right side of the obstacle, the controller is configured to control the wheel-driving motor and traveling wheel so that the main body performs the left tracing traveling.

3. The robot cleaner according to claim 1, wherein:
   when the obstacle is located on the traveling direction of the main body and the light spot is located at a left side of the obstacle, the controller is configured to control the wheel-driving motor and traveling wheel so that the main body performs the right tracing traveling.

4. The robot cleaner according to claim 1, wherein:
   when the obstacle is located at a side of the main body, the controller is configured to control the wheel-driving motor and traveling wheel so that the main body traces the obstacle outline according to the obstacle position.

5. The robot cleaner according to claim 4, wherein:
   when the obstacle is located at a right side of the main body, the controller is configured to control the wheel-driving motor and traveling wheel so that the main body traces the right tracing traveling.

6. The robot cleaner according to claim 4, wherein:
   when the obstacle is located at a left side of the main body, the controller is configured to control the wheel-driving motor and traveling wheel so that the main body traces the left tracing traveling.

7. The robot cleaner according to claim 1, wherein:
   when the obstacle is located not only at the traveling direction of the main body but also at a side of the main body, the controller is configured to control the wheel-driving motor and traveling wheel so that the main body performs the obstacle outline according to the light spot position and the obstacle position.

8. The robot cleaner according to claim 7, wherein:
   when the obstacle is located not only at the traveling direction of the main body but also at a right side of the main body, the controller is configured to control the wheel-driving motor and traveling wheel so that the main body performs the right tracing traveling.

9. The robot cleaner according to claim 7, wherein:
   when the obstacle is located not only at the traveling direction of the main body but also at a left side of the main body, the controller is configured to control the wheel-driving motor and traveling wheel so that the main body performs the left tracing traveling.

10. The robot cleaner according to claim 7, wherein:
    when the obstacle is located not only at the traveling direction of the main body but also at both sides of the main body, the controller is configured to control the wheel-driving motor and traveling wheel so that the main body performs any one of the right tracing traveling and the left tracing traveling in response to the light spot position.

11. The robot cleaner according to claim 1, wherein:
    when the light spot is located opposite to the obstacle during the outline tracing traveling, the controller traces the light spot.

12. The robot cleaner according to claim 1, wherein the controller divides a light reception region for light-spot detection into a plurality of reception regions according to respective directions, and determines a reception region in which the light spot is located from among the plurality of reception regions.

13. The robot cleaner according to claim 1, wherein the controller divides an obstacle detection region for obstacle detection into a plurality of detection regions according to respective directions, and determines a detection region in which the obstacle is located from among the plurality of detection regions.

14. A method for controlling a robot cleaner having a main body and a controller, comprising:
    receiving modulated light including a control command of a user by the controller;
    tracing a light spot formed by the light; and
    detecting an obstacle,
    wherein when the obstacle is detected, performing any one of right tracing traveling and left tracing traveling according to a position of the light spot and a position of the obstacle and traveling to the light spot position along a minimum path via right tracing traveling or left tracing traveling according to the minimum path, the performing of any one of the right tracing traveling and the left tracing traveling includes when the obstacle is located on a traveling direction of the main body and the light spot is located at a right side of the obstacle, performing the left tracing traveling, and when the obstacle is located at a traveling direction of the main body and the light spot is located at a left side of the obstacle, performing the right tracing traveling.

15. The method according to claim 14, wherein the performing of any one of the right tracing traveling and the left tracing traveling includes:

when the obstacle is located at a right side of the robot cleaner, performing the right tracing traveling.

16. The method according to claim 14, wherein the performing of any one of the right tracing traveling and the left tracing traveling includes:

when the obstacle is located at a left side of the robot cleaner, performing the left tracing traveling.

* * * * *